(12) United States Patent
Massarella et al.

(10) Patent No.: US 10,140,324 B2
(45) Date of Patent: Nov. 27, 2018

(54) PROCESSING SPATIOTEMPORAL DATA RECORDS

(71) Applicant: CRFS Limited, Cambridge (GB)

(72) Inventors: Alistair Massarella, Cambridge (GB); Daniel Timson, Cambridge (GB); Stewart Hyde, Cambridge (GB)

(73) Assignee: CRFS Limited, Cambridge (GB)

( * ) Notice: Subject to any disclaimer, the term of this patent is extended or adjusted under 35 U.S.C. 154(b) by 528 days.

(21) Appl. No.: 14/879,576

(22) Filed: Oct. 9, 2015

(65) Prior Publication Data

US 2016/0140153 A1    May 19, 2016

(30) Foreign Application Priority Data

Oct. 9, 2014  (EP) .................................. 14188345

(51) Int. Cl.
*G06F 17/30* (2006.01)

(52) U.S. Cl.
CPC .. *G06F 17/30327* (2013.01); *G06F 17/30241* (2013.01); *G06F 17/30333* (2013.01); *G06F 17/30336* (2013.01); *G06F 17/30339* (2013.01); *G06F 17/30551* (2013.01)

(58) Field of Classification Search
CPC ......... G06F 17/30327; G06F 17/30241; G06F 17/30333; G06F 17/30336; G06F 17/30339; G06F 17/30551; G06F 17/30321; G06F 17/30312; G06F 17/30619; G06F 17/30961; G06F 17/3087; Y10S 707/921; Y10S 707/957

USPC .......................................................... 707/743
See application file for complete search history.

(56) References Cited

U.S. PATENT DOCUMENTS

| | | | |
|---|---|---|---|
| 7,991,779 B1 * | 8/2011 | Drory ............... | G06F 17/30321 707/705 |
| 8,078,394 B2 | 12/2011 | Wang et al. | |
| 8,856,184 B1 | 10/2014 | Udeshi et al. | |
| 2012/0197898 A1 * | 8/2012 | Pandey ............. | G06F 17/30333 707/741 |

(Continued)

OTHER PUBLICATIONS

Extended European Search Report issued in European Application No. 14188345.4, dated Mar. 27, 2015.

(Continued)

*Primary Examiner* — Evan Aspinwall
(74) *Attorney, Agent, or Firm* — McCarter & English, LLP; David R. Burns

(57) ABSTRACT

A method for processing a primary data record, a spatial tree index and a plurality of time tree indexes is described. The method includes writing the primary data record to a primary data table, determining whether a spatial tree leaf node including location data exists and, if not, generating a spatial tree leaf node including the location data, and creating or updating spatial tree nodes connecting the spatial tree leaf node to a spatial tree root node. For spatial tree nodes including the location data, updating a respective time tree index by determining whether a time tree leaf node including time data exists and, if not, generating a time tree leaf node including the time data, and creating or updating time tree nodes connecting the time tree leaf node to a time tree root node. The time tree leaf node updated to include a pointer to the primary data record.

14 Claims, 22 Drawing Sheets

(56) References Cited

U.S. PATENT DOCUMENTS

2012/0197900 A1\* 8/2012 Mandre ............ G06F 17/30327
                                                707/743
2012/0197911 A1\* 8/2012 Banka ............... G06F 17/30864
                                                707/752
2014/0099938 A1\* 4/2014 Calo ................. G06F 17/30327
                                                455/422.1

OTHER PUBLICATIONS

Noel, G. et al., "The Po-tree: a Real-time Spatiotemproal Data Indexing Structure," Springer-Verlag, Jan. 2015 (12 pages).

\* cited by examiner

FIG. 11A  FIG. 11B  FIG. 11C  FIG. 11D
FIG. 11E  FIG. 11F  FIG. 11G  FIG. 11H

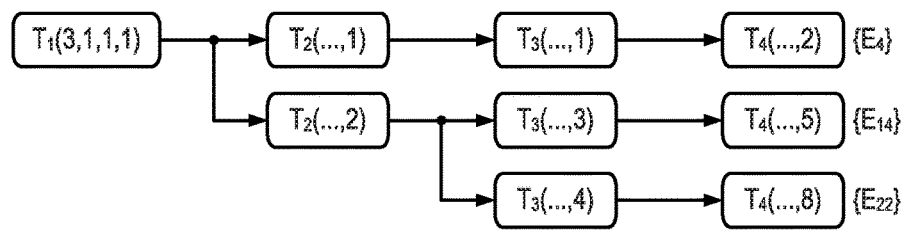
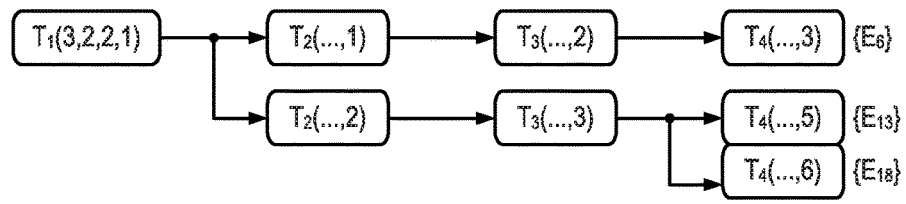
FIG. 16A
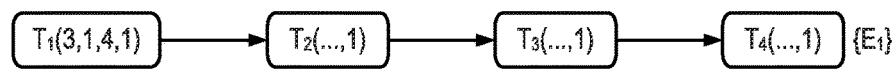
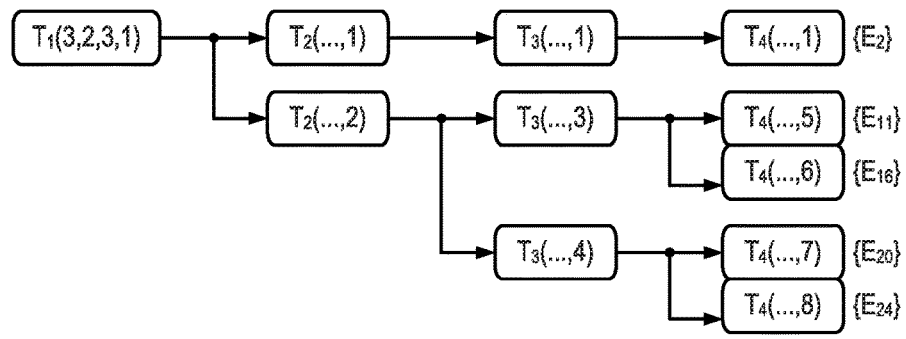
FIG. 16B

| Num. | Subset | Node(s) |
|---|---|---|
| 1 | {$E_1,E_2,E_3$} | $T_4(1,1,1,1)$ |
| 2 | {$E_4,E_5$} | $T_4(1,1,1,2)$ |
| 3 | {$E_6,E_7,E_8$} | $T_4(1,1,1,3)$ |
| 4 | {$E_9,E_{10}$} | $T_4(1,1,1,4), T_4(2,2,2,4)$ |
| 5 | {$E_{11},E_{12},E_{13},E_{14},E_{15}$} | $T_4(1,1,1,5)$ |
| 6 | {$E_{16},E_{17},E_{18},E_{19}$} | $T_4(1,1,1,6)$ |
| 7 | {$E_{20},E_{21}$} | $T_4(1,1,1,7)$ |
| 8 | {$E_{22},E_{23},E_{24}$} | $T_4(1,1,1,8)$ |
| 9 | {$E_1,E_2,E_3,E_4,E_5$} | $T_3(1,1,1,1)$ |
| 10 | {$E_6,E_7,E_8,E_9,E_{10}$} | $T_3(1,1,1,2)$ |
| 11 | {$E_{11},E_{12},E_{13},E_{14},E_{15},E_{16},E_{17},E_{18},E_{19}$} | $T_3(1,1,1,3)$ |
| 12 | {$E_{20},E_{21},E_{22},E_{23},E_{24}$} | $T_3(1,1,1,4)$ |
| 13 | {$E_1,E_2,E_3,E_4,E_5,E_6,E_7,E_8,E_9,E_{10}$} | $T_2(1,1,1,1)$ |
| 14 | {$E_{11},E_{12},E_{13},E_{14},E_{15},E_{16},E_{17},E_{18},E_{19},E_{20},E_{21},E_{22},E_{23},E_{24}$} | $T_2(1,1,1,2)$ |
| 15 | {$E_1,E_2,E_3,E_4,E_5,E_6,E_7,E_8,E_9,E_{10},E_{11},E_{12},E_{13},E_{14},E_{15},E_{16},E_{17},E_{18},E_{19},E_{20},E_{21},E_{22},E_{23},E_{24}$} | $T_1(1,1,1,1)$ |
| 16 | {$E_{13},E_{14}$} | $T_4(2,1,1,5)$ |
| 17 | {$E_{13},E_{14},E_{18}$} | $T_3(2,1,1,3)$ |
| 18 | {$E_4,E_6$} | $T_2(2,1,1,1)$ |
| 19 | {$E_{13},E_{14},E_{18},E_{22}$} | $T_2(2,1,1,2)$ |
| 20 | {$E_4,E_6,E_{13},E_{14},E_{18},E_{22}$} | $T_1(2,1,1,1)$ |
| 21 | {$E_1,E_2$} | $T_4(2,1,2,1), T_3(2,1,2,1), T_2(2,1,2,1)$ |
| 22 | {$E_{16},E_{17}$} | $T_4(2,1,2,6)$ |
| 23 | {$E_{11},E_{16},E_{17}$} | $T_3(2,1,2,3)$ |
| 24 | {$E_{20},E_{24}$} | $T_3(2,1,2,4)$ |
| 25 | {$E_{11},E_{16},E_{17},E_{20},E_{24}$} | $T_2(2,1,2,2)$ |
| 26 | {$E_1,E_2,E_{11},E_{16},E_{17},E_{20},E_{24}$} | $T_1(2,1,2,1)$ |
| 27 | {$E_{12},E_{19}$} | $T_3(2,2,1,3)$ |
| 28 | {$E_{12},E_{19},E_{21}$} | $T_2(2,2,1,2)$ |
| 29 | {$E_7,E_{12},E_{19},E_{21}$} | $T_1(2,2,1,1)$ |
| 30 | {$E_3,E_5$} | $T_3(2,2,2,1), T_3(3,3,3,1)$ |
| 31 | {$E_8,E_9,E_{10}$} | $T_3(2,2,2,2)$ |
| 32 | {$E_3,E_5,E_8,E_9,E_{10}$} | $T_2(2,2,2,1)$ |
| 33 | {$E_{15},E_{23}$} | $T_2(2,2,2,2)$ |
| 34 | {$E_3,E_5,E_8,E_9,E_{10},E_{15},E_{23}$} | $T_1(2,2,2,1)$ |
| 35 | {$E_{14},E_{22}$} | $T_2(3,1,1,2)$ |
| 36 | {$E_4,E_{14},E_{22}$} | $T_1(3,1,1,1)$ |
| 37 | {$E_{13},E_{18}$} | $T_3(3,2,2,3), T_2(3,2,2,2)$ |
| 38 | {$E_6,E_{13},E_{18}$} | $T_1(3,2,2,1)$ |
| 39 | {$E_{11},E_{16}$} | $T_3(3,2,3,3)$ |
| 40 | {$E_{20},E_{24}$} | $T_3(3,2,3,4)$ |
| 41 | {$E_{11},E_{16},E_{20},E_{24}$} | $T_2(3,2,3,2)$ |
| 42 | {$E_2,E_{11},E_{16},E_{20},E_{24}$} | $T_1(3,2,3,1)$ |
| 43 | {$E_7,E_{19}$} | $T_1(3,3,1,1)$ |
| 44 | {$E_3,E_5,E_9$} | $T_2(3,3,3,1), T_1(3,3,3,1)$ |
| 45 | {$E_8,E_{10}$} | $T_3(3,3,4,2), T_2(3,3,4,1)$ |
| 46 | {$E_8,E_{10},E_{23}$} | $T_1(3,3,4,1)$ |

FIG. 19

PROCESSING SPATIOTEMPORAL DATA RECORDS

RELATED APPLICATIONS

This application is a 35 U.S.C. § 119 National Stage filing of European Application No. 14188345.4 filed on Oct. 9, 2014. The entire contents of the foregoing application are explicitly incorporated herein by reference.

FIELD OF THE INVENTION

The present invention relates to processing spatiotemporal data records. For example, data records which include location data and time data associated with the data record.

BACKGROUND

When large volumes of data (e.g. hundreds of Gb or more than 1 Tb) are collected, methods for analysing and displaying the data can be used to assist a user in finding and/or reviewing desired data. For example, a dataset might include several thousands or hundreds of thousands of Radio Frequency, RF, spectrum measurements. Suitable methods can include pre-processing, index building, and hierarchical searching.

For example, U.S. Pat. No. 8,078,394 B2 describes processing Global Positioning System, GPS, data into a track of spatially-partitioned segments such that each segment has a cell. Each cell has an associated temporal index into which data for the segments of the cell are inserted.

In another example, G. Noël et. al. "The Po-tree: a Real-time Spatiotemporal Data Indexing Structure", Developments in Spatial Data Handling 2005, pp 259-270, 11th International Symposium on Spatial Data Handling, describes indexing measurement data from sensors using a KD tree index for the sensor locations, with spatial nodes corresponding to each sensor linked to a modified B+ tree time index structure for measurements from that sensor.

SUMMARY

The invention relates to processing, storing, accessing and querying structured data records such as, for example, RF spectrum data collected at a number of locations and over a range of times. For example, data records may correspond to an event and/or a measurement, and may include location information and time information. Location information may include, for example, latitude and longitude, map grid reference, postal or zip code etc. Time information may include, for example, the time and/or date to which the data record corresponds. Data records may include additional parameters or measurements providing information about the event and/or measurement. The present invention seeks to help enable users to query and retrieve data records from a large volume of data more efficiently.

The present invention also seeks to provide a database which can enable users to view summary data aggregated across space and/or time without the delay and computational expense of searching for and retrieving all of the corresponding raw data.

According to a first aspect of the present invention there is provided a method of processing a primary data record comprising location data, time data and measurement data, a spatial tree index comprising spatial tree nodes linked by pointers, each spatial tree node corresponding to a given spatial region and further including a pointer to a respective time tree index, and a plurality of time tree indexes, each time tree index corresponding to a respective spatial tree node and comprising time tree nodes linked by pointers, wherein each time tree node corresponds to a given time period. The method comprises writing the primary data record to a primary data table, determining whether a spatial tree leaf node exists which corresponds to the spatial region that includes the location data, on a negative determination, generating a spatial tree leaf node which corresponds to the spatial region that includes the location data, and creating or updating spatial tree nodes connecting the spatial tree leaf node to the spatial tree root node. For the spatial tree nodes which correspond to each region that includes the location data, updating the respective time tree index by determining whether a time tree leaf node exists which corresponds to the time period that includes the time data, on a negative determination, generating the time tree leaf node which corresponds to the time period that includes the time data, and creating or updating time tree nodes connecting the time tree leaf node to the time tree root node, and updating the time tree leaf node to include a pointer to the primary data record.

Thus, the nodes of the spatial tree index, not just the spatial tree leaf nodes, have a corresponding time tree index. The leaf nodes of each time tree index point to the corresponding raw data records. As a result, a search directed to a particular period of time and a particular region which corresponds to more than one spatial tree leaf node can use time-tree indexes corresponding to spatial branch nodes (or even the root node) to retrieve the relevant records whilst searching fewer time tree indexes. This can improve the efficiency of data record search, retrieval and analysis.

The spatial tree index may be a quad tree index, such that the spatial tree root node corresponds to an overall spatial region and each higher level of the spatial tree index includes $4^{n-1}$ $n^{th}$ level spatial tree nodes, each of the $n^{th}$ level spatial tree nodes corresponding to a spatial sub-region formed by dividing the overall region into $4^{n-1}$ equal sized parts, in which n is equal to the number of connections between spatial tree root node and an $n^{th}$ level spatial tree node plus one According to a second aspect of the present invention there is provided a method of generating a database, the method comprising processing a plurality of primary data records using a method according to the first aspect. For each time tree node, determining a subset of the plurality of primary data records which have time data included in the respective time period and location data included in the respective spatial region. In dependence on the subset including one primary data record, updating the time tree node to further include a data pointer to the primary data record. In dependence on the subset including more than one primary data record, generating an aggregated data record by aggregating the measurement data of the respective primary records included in the subset, writing the aggregated data record to an aggregated data table and updating the time tree node to further include a data pointer to the aggregated data record.

Thus, a user selects a particular region and a particular time period and reviews summary statistics of the relevant set of data records, without the time delay and computational expense of retrieving and processing every data record corresponding to the particular region and time period. This can further improve the efficiency of data record search, retrieval and analysis.

An aggregated data record may only be generated for a distinct subset, such that the data pointers of time tree nodes which correspond to an identical subset point to a single aggregated data record.

Each time tree node which belongs to a time tree index that corresponds to a spatial tree leaf node may further include a list of pointers to each of the primary data records included in the respective subset.

The measurement data of each primary data record may comprise one or more sets of measured values corresponding to respective values of an independent variable. The method may further comprise, for each primary and/or aggregated data record, generating at least one corresponding down-sampled data record by aggregating the measured values of the data record based on ranges of the independent variables. Writing the down-sampled data record to a down-sampled data table and updating each time tree node to further include at least one down-sampled data pointer to a down-sampled data record which corresponds to a data record pointed to by the time tree node. The measured values may comprise Radio Frequency, RF, signal powers and the respective values of the independent variables may be frequencies.

Generating aggregated data records may comprise calculating summary statistics based on the measurement data of primary data records. Aggregating may include calculating a mean, a median and/or a mode average of the measurement data. Aggregating may include summing. Generating aggregated data records may further include calculating a standard deviation, a range, a maximum, a minimum and/or a plurality of specified percentile values based on the measurement data. Generating aggregated data records may also include determining parameters of a model such that the model provides the best fit to, or has the minimum sum of squared deviations from, the measurement data of the subset of primary data records.

The data tables of data records may be written to a computer readable storage medium.

Data stored on the computer readable storage medium may be accessed in units of pages, and storing the data tables of data records may comprise writing the data records to the storage medium in blocks, each block based on a given range of the independent variable such that individual data records are stored in a striped fashion across a plurality of blocks, and blocks are written sequentially to the storage medium based on the respective range of the independent variable and a pointer to a given data record points to the location of the computer readable storage medium corresponding to the start of the given data record in the first block.

According to a third aspect of the present invention, there is provided a method of searching a database produced according to the first or second aspects, the searching method comprising receiving a query including spatial region information and time period information. Selecting one or more spatial tree nodes based on the spatial region information and, for each of the time tree indexes corresponding to the selected one or more spatial tree nodes, selecting one or more time tree nodes based on the time period information and retrieving one or more data records pointed to by the selected time tree nodes.

The searching method may further comprise retrieving one or more data records pointed to by time tree nodes descendent from the selected time tree node.

According to a fourth aspect of the present invention, there is a provided a computer program which when executed by a data processing apparatus causes the data processing apparatus to perform a according to one of the first to third aspects.

According to a fifth aspect of the present invention there is provided a computer readable storage medium storing a computer program according to the fourth aspect.

According to a sixth aspect of the present invention there is provided apparatus configured to carry out a method according to one of the first to third aspects.

According to a seventh aspect of the present invention there is provided apparatus for processing a plurality of primary data records, each comprising location data, time data and measurement data, the apparatus comprising a primary data table formatting module configured to receive the plurality of primary data records and write them to a primary data table and an index generation module configured to generate a spatial tree index comprising spatial tree nodes linked by pointers, each spatial tree node corresponding to a spatial region and further including a pointer to a respective time tree index, and a plurality of time tree indexes, each time tree index corresponding to a respective spatial tree node and comprising time tree nodes linked by pointers, wherein each time tree node corresponds to a time period. The index generation module is configured to generate the spatial tree index and the plurality of time tree indexes by sequentially receiving each primary data record and, for each primary data record, determine whether a spatial tree leaf node exists which corresponds to the spatial region that includes the location data and, on a negative determination, generate a spatial tree leaf node which corresponds to the spatial region that includes the location data, and to create or update spatial tree nodes connecting the spatial tree leaf node to the spatial tree root node and, for each time tree index pointed to by a spatial tree node which corresponds to a spatial region that includes the location data, determine whether a time tree leaf node exists which corresponds to the time period that includes the time data and, on a negative determination, generate the time tree leaf node which corresponds to the time period that includes the time data, and create or update time tree nodes connecting the time tree leaf node to the time tree root node and, update the time tree leaf node to include a pointer to the primary data record.

The index generation module may be further configured to determine, for each time tree node, a subset of the plurality of primary data records which have time data included in the respective time period and location data included in the respective spatial region. The apparatus may further comprise a data record aggregation module configured to receive a plurality of subsets and to generate, for each subset, a corresponding aggregated data record by aggregating the measurement data of the respective primary data records included in the subset. The apparatus may further comprise an aggregated data table formatting module configured to receive the plurality of aggregated data records and write them to an aggregated data table, wherein the index generation module is further configured to update each time tree node to include a data pointer configured to, in dependence on the respective subset comprising one primary data record, point to the primary data record and, in dependence on the subset comprising more than one primary data record, point to the corresponding aggregated data record.

The aggregated data table may only include aggregated data records corresponding to distinct subsets of primary data records.

According to an eighth aspect of the present invention there is provided a database for storing a plurality of primary data records comprising location data, time data and measurement data, the database comprising a primary data table holding the plurality of primary records. A spatial quad tree index comprising a plurality of spatial tree nodes, each spatial tree node corresponding to a spatial region and including a pointer the time tree root node of a corresponding time tree index and a list of up to four pointers to respective child spatial tree nodes. A plurality of time tree indexes, each time tree index corresponding to a respective spatial tree node and comprising a plurality of time tree nodes, each time tree node corresponding to a time period and including, in dependence on the time tree node being a root or branch node, a list of one or more pointers pointing to respective child time tree nodes and, in dependence on the time tree node being a leaf node, a list of one or more pointers pointing to primary data records which have time data included in the respective time period and location data included in the respective spatial region.

The database may further comprise an aggregated data table storing a plurality of aggregated data records, each aggregated data record generated by aggregating the measurement data of a subset of the plurality of primary records, wherein each time tree node further includes a data pointer configured such that, in dependence on the time period corresponding to the time tree node and the spatial region corresponding to the respective spatial tree node corresponding to a single primary data record, the data pointer points to the primary data record, in dependence on the time period corresponding to the time tree node and the spatial region corresponding to the respective spatial tree node corresponding to a subset of more than one primary data record, the data pointer points to the aggregated data record corresponding to the subset of primary data records, wherein the aggregated data table only includes aggregated data records corresponding to distinct subsets of primary records.

According to a ninth aspect of the present invention there is provided a computer readable storage medium storing the database according to the eighth aspect.

BRIEF DESCRIPTION OF THE DRAWINGS

Certain embodiments of the present invention will now be described, by way of example, with reference to the accompanying drawings in which:

FIGS. 11A-11H schematically illustrate a spatial-temporal distribution of some particular primary data records;

FIGS. 16A-16D schematically illustrate time tree index corresponding to the level three spatial tree leaf nodes of the spatial tree index shown in FIG. 13;

FIG. 19 schematically illustrates an aggregated data table generated for the primary data records shown in FIG. 11;

DETAILED DESCRIPTION OF CERTAIN EMBODIMENTS

Figure 1:
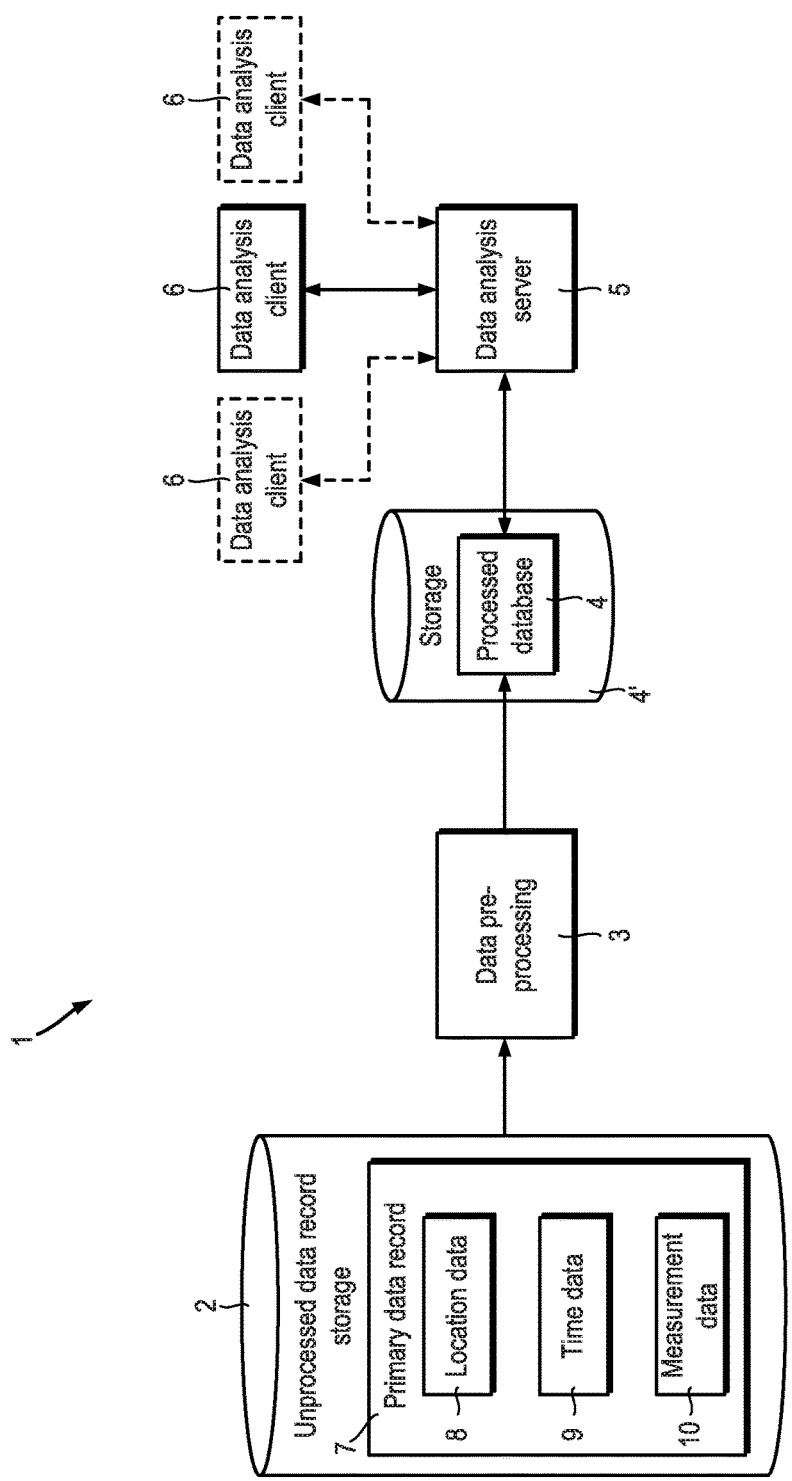
FIG. 1 is a schematic block diagram of a data processing and analysis system which includes a data pre-processing module, a processed database and a data analysis server.

Referring to FIG. 1, a data processing and analysis system 1 is shown. The data processing and analysis system 1 is used to process, store, search and retrieve spatiotemporal data records which include location data and time data.

The data processing and analysis system 1 includes unprocessed data record storage 2, a data pre-processing module 3, a processed database 4 stored in processed database storage 4', a data analysis server 5 and one or more data analysis clients 6. The data pre-processing module 3, the data analysis server 5 and the data analysis client(s) may be provided by one computer system, or they may be provided by several computer systems communicating over a network. The unprocessed data record storage 2 and the processed database storage 4' may be provided by the same storage medium, or they may be provided by separate storage mediums. Each of the unprocessed data record storage 2 and the processed database storage 4' may include multiple storage media, for example, the processed database 4' may be stored in a RAID configuration across multiple hard disc drives. The unprocessed data record storage 2 and the processed database storage 4' may be part of the same computer system as the data pre-processing module 3 and/or data analysis server 5. Alternatively, the data pre-processing module 3 and/or data analysis server 5 may access the unprocessed data record storage 2 and/or the processed database storage 4' across a network.

The unprocessed data record storage 2 stores a set of primary data records 7. Each primary data record 7 includes location data 8, time data 9 and measurement data 10 associated with the primary data record 7. The primary data records 7 in the unprocessed data record storage 2 need not be ordered. Location data 8 may include information such as, for example, latitude and longitude coordinates, a map grid reference, a street address, a postal or zip code or a combination of several types of location data. Location data 8 may be one, two or three dimensional. For example, the location data 8 may include altitude above sea level. Time data 9 may specify the time associated with the primary data record 7 to any required level of precision such as, for example, years, days, hours, minutes, seconds, milliseconds, microseconds, nanoseconds, picoseconds or femtoseconds, depending on the precision of recording and the typical timescale of the events and/or measurements which correspond to the primary data records 7.

In examples described hereinafter, the measurement data 10 is radio spectrum data in the form of measured values of signal power at respective given frequencies. The measurement data 10 may include ancillary other data such as, for example, a measure of GPS location quality. However, primary data records 7 may include any suitable type of measurement data 10 which can be assigned to a location, a time and electronically recorded. For example, image data, sound recordings in the time or frequency domain, video data, temperatures, rainfall data, magnetic fields etc.

The data pre-processing module 3 receives primary data records 7 and produces processed data including hierarchical multi-dimensional indices and table(s) of data records. The processed database storage 4' stores the processed database 4 produced by the data pre-processing module 3.

The processed database 4 may be generated by processing a single batch of primary data records 7 or by processing multiple batches of primary data records 7. The processed database 4 may be updated after it has been produced to include further primary data records 7. However, the processed database need not be updatable, and alternatively the data processing and analysis system 1 may re-generate the processed database 4 when further primary data records 7 are added to the unprocessed data record storage 2. The data pre-processing module 3 may update or re-generate the processed database 4 to include further primary data records 7 added to the unprocessed data storage 2 in response to user input or according to a pre-set or user definable schedule. For example, the processed database 4 may be updated every day, every week or every month. Detailed examples of the data pre-processing module 3 and the processed database 4 are described hereinafter.

The data analysis server 5 receives query requests from one or more data analysis clients 6 (hereinafter referred to simply as "clients"). The data analysis server 5 is able to search the processed database 4, retrieve data records and respond to the query requests.

Data Pre-Processing Module 2 and Processed Database 4

Figure 2:
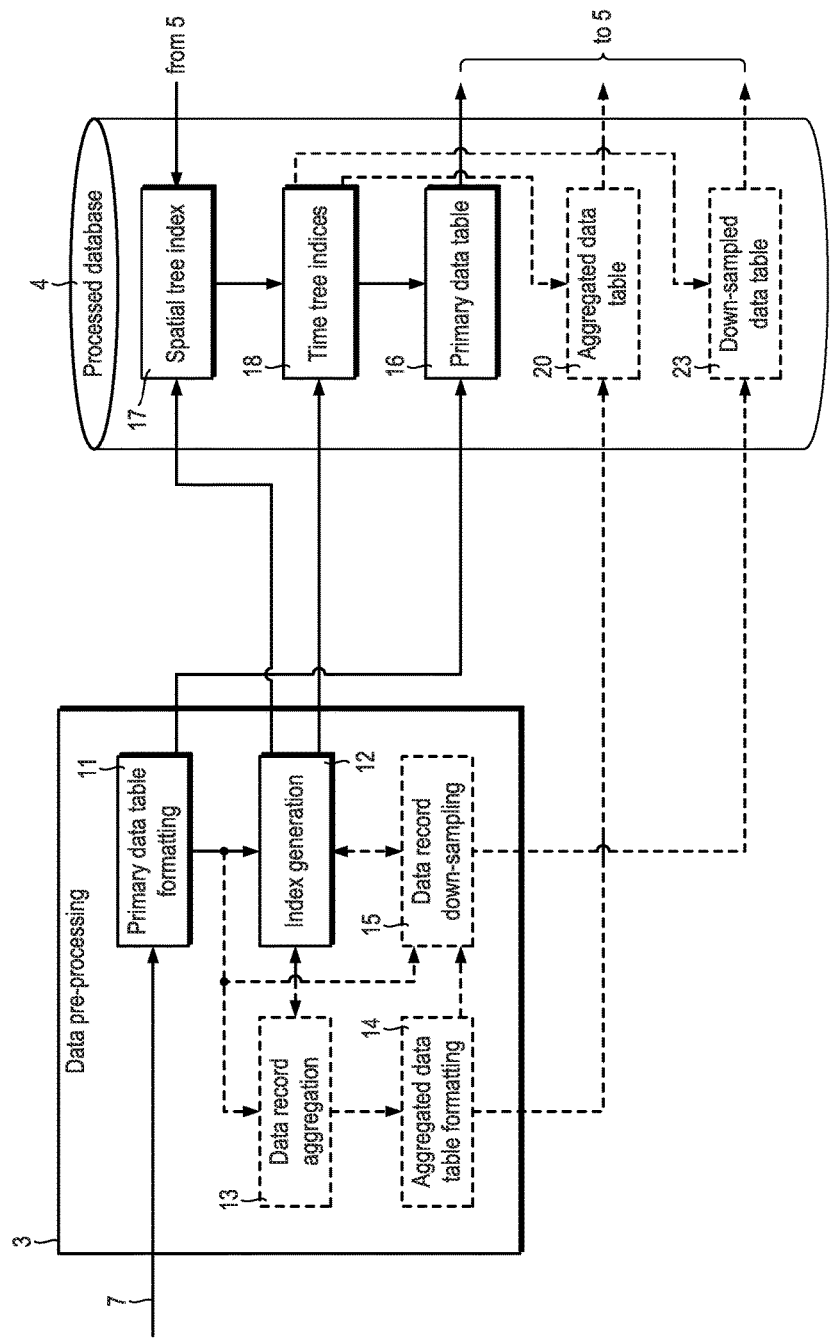
FIG. 2 is a schematic block diagram of a data pre-processing module and a processed database.
Figure 6:
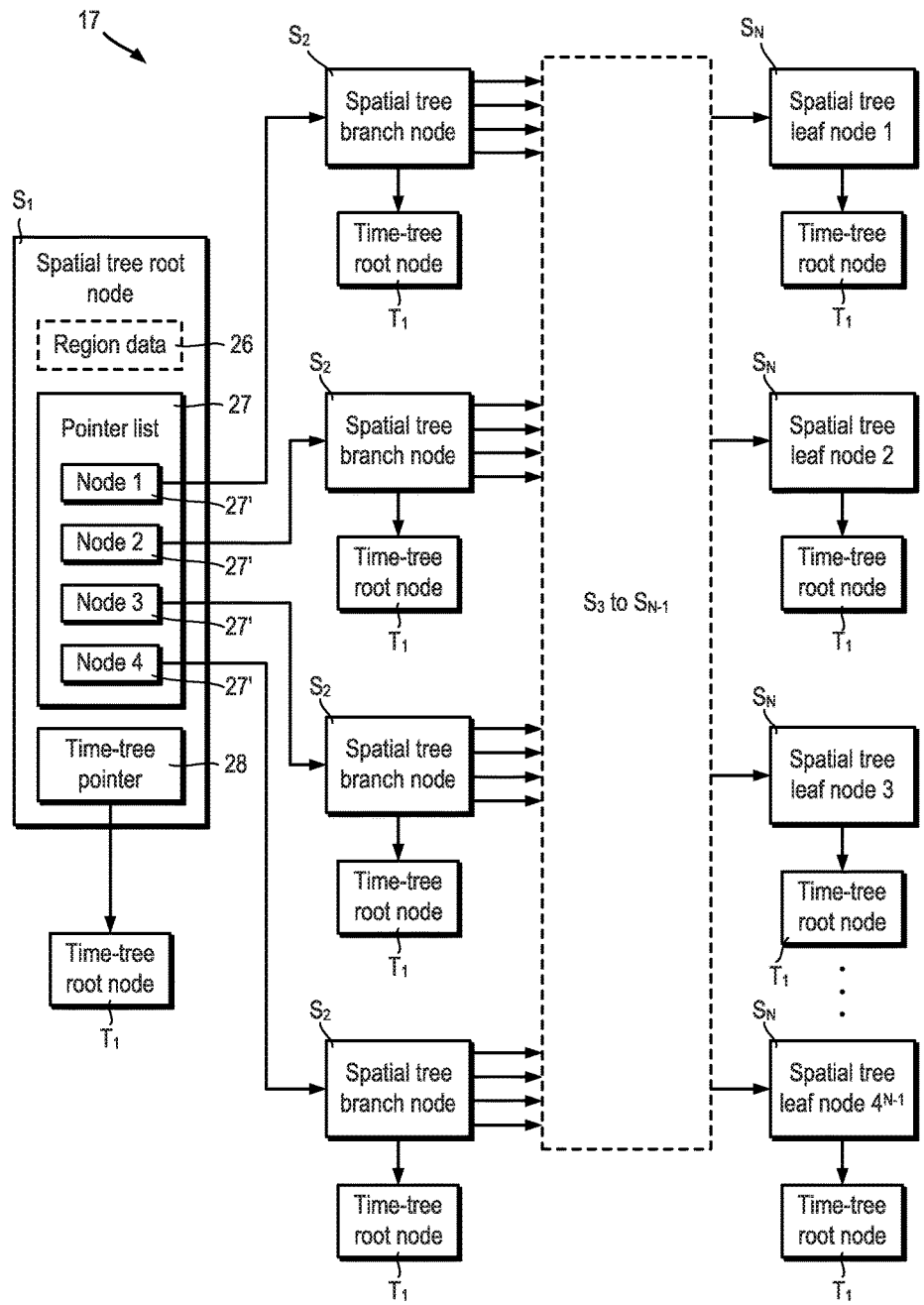
FIG. 6 schematically illustrates a spatial tree index included in the processed database.
Figure 7:
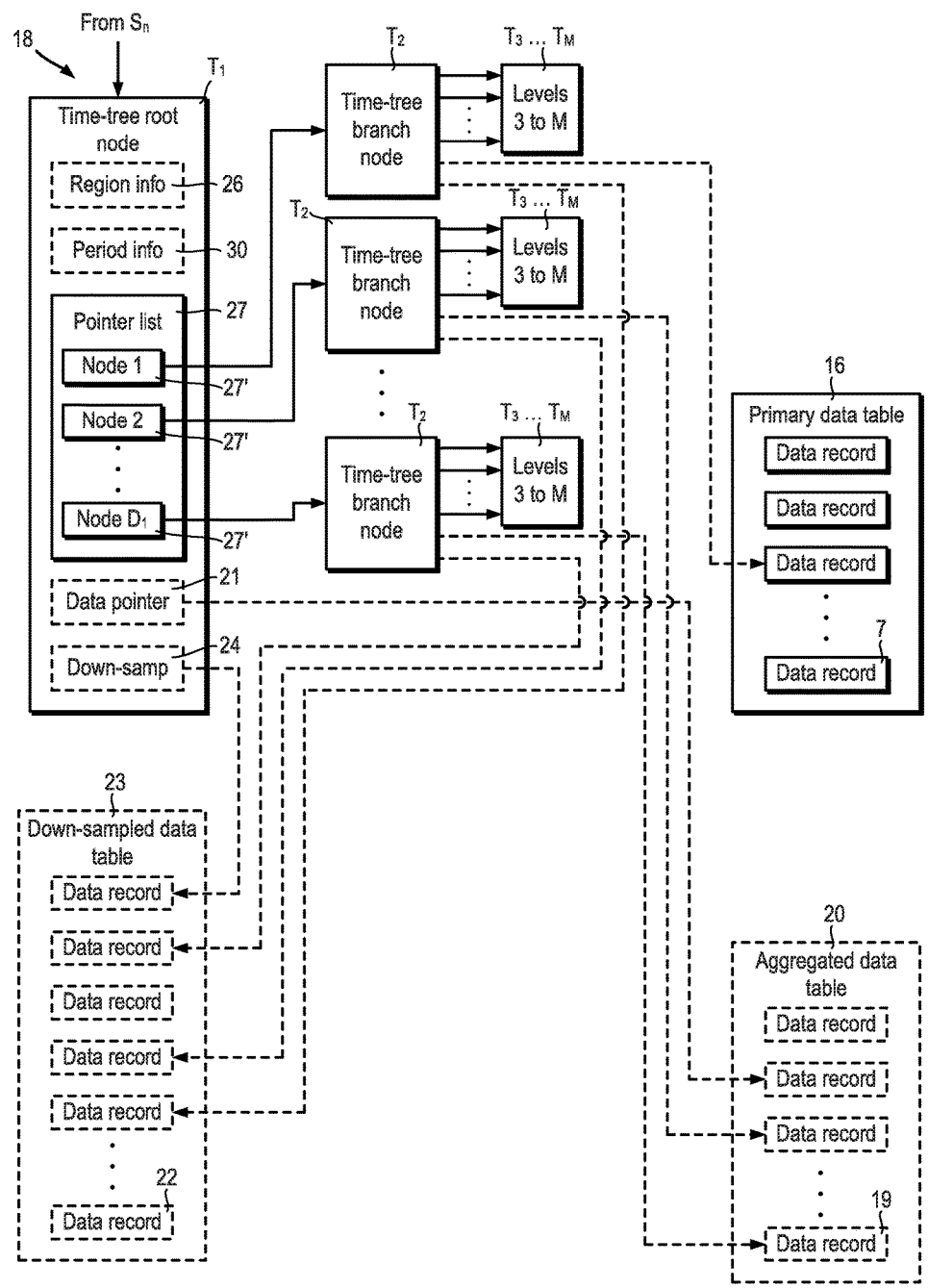
FIG. 7 schematically illustrates a time tree index included in the processed database.
Figure 8:
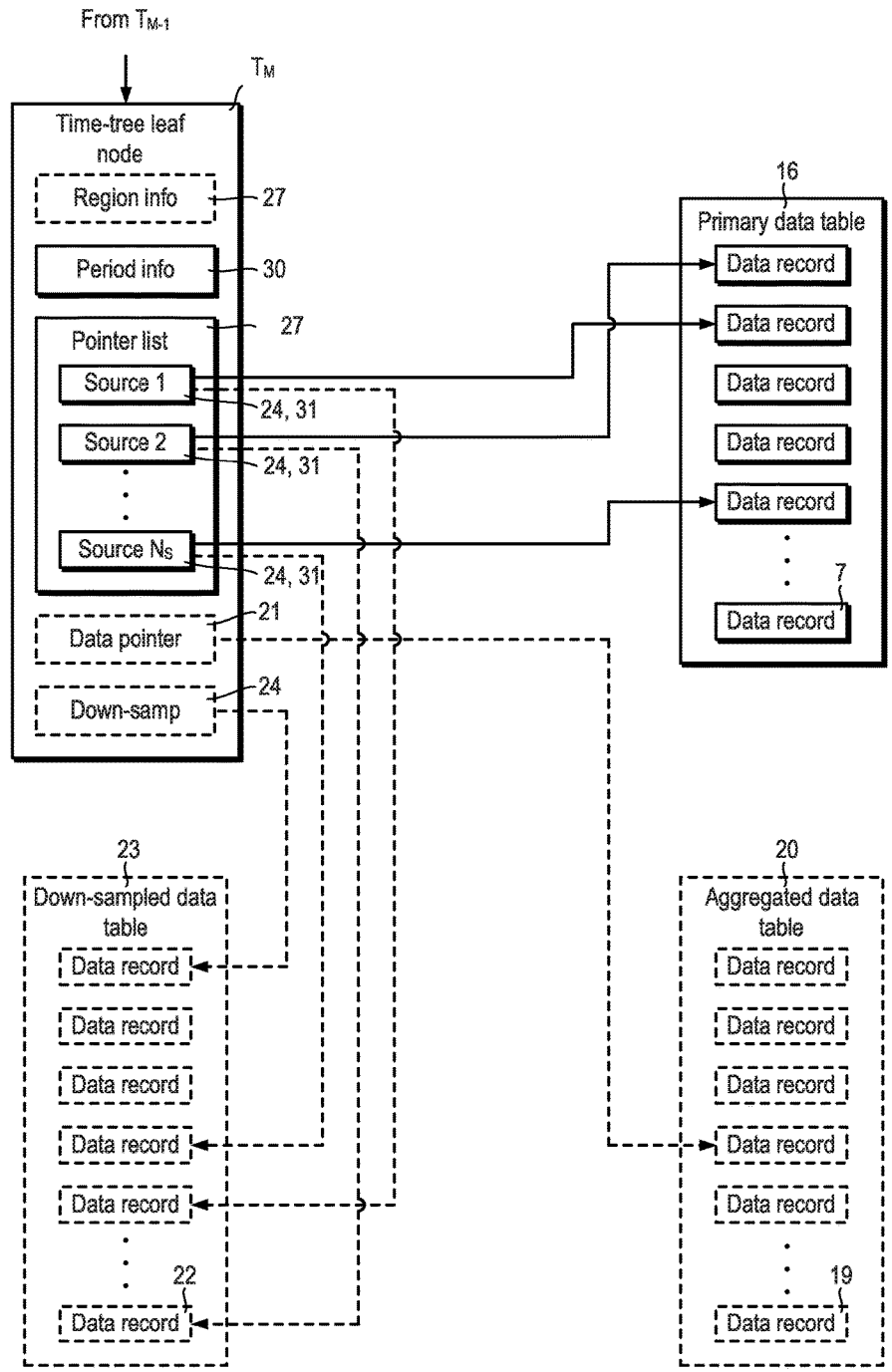
FIG. 8 schematically illustrates a time tree leaf node included in the time tree index.

Referring to FIG. 2, the data pre-processing module 3 and the processed database 4 are shown in more detail. Reference is also made to FIGS. 6, 7 and 8, which show examples of spatial and time tree indexes.

The data pre-processing module 3 includes a primary data table formatting module 11 and an index generation module 12. The data pre-processing module 3 may also include a data record aggregation module 13, an aggregated data table formatting module 14 and/or a data record down-sampling module 15.

The unprocessed data storage 2 may store the primary data records 7 in a single file format or in multiple file formats. The unprocessed data storage 2 may store the primary data records 7 in a single file, or in multiple separate files.

The primary data table formatting module 11 receives primary data records 7 from the unprocessed data record storage 2 and generates a primary data table 16 holding the primary data records 7. The primary data table formatting module 11 may write the primary data records 7 to the primary data table 16 as they are received. Alternatively, the primary data table formatting module 11 may temporarily store two or more primary data records 7 before writing them to the primary data table 16 in a particular order. For example, the primary data table formatting module 11 may arrange primary data records 7 into order according to the location data 8, the time data 9 or the measurement data 10. The primary data table formatting module 11 may order one or more primary data records 7 for striped/interleaved storage on hard disc drive, magnetic tape drive or CD/DVD. The primary data table formatting module 11 may receive primary data records 7 in multiple file formats and output the primary data records 7 in a common file format. The primary data table formatting module 11 may read the primary data records 7 from multiple separate files and write the primary data table 16 to a single file.

The index generation module 12 receives the primary data records 7 and generates a spatial tree index 17 and time tree indexes 18. The index generation module 12 may receive the primary data records 7 one at a time or in batches of two or more. The index generation module 12 may receive the complete primary data table 16 or a list of pointers to primary data records 7 stored in the primary data table 16. The spatial tree index 17 comprises a set of spatial tree nodes $S_n$ linked by pointers 27' into a hierarchical structure with N levels, where $1 \leq n \leq N$. In the description herein, the level of a given node in a spatial/time tree index is one plus the number of connections between the given node and the root node.

Each spatial tree node $S_n$ corresponds to a particular spatial region. Each spatial region represents a set of locations bounded by a spatial region boundary. In the case that primary data records 7 including two-dimensional location data are indexed, a spatial region represents a set of locations inside a boundary curve. In the case that primary data records 7 including three-dimensional location data 8 are indexed, a spatial region represents a set of locations inside a boundary surface and the spatial tree index 17 may be of a suitable type, for example, an oct-tree. Examples of spatial regions include the earth, a given country, a range of latitude and longitude, a map grid square or squares, a town or a postal or zip code. Hereinafter, where reference is made to a region, it should be taken to refer to a spatial region as described hereinbefore. The spatial tree index 17 includes at least a spatial tree root node $S_1$ which corresponds to an overall spatial region of interest, and at least one higher level of spatial tree nodes $S_n$ pointed to by the spatial tree root node $S_1$. Each $n^{th}$ level spatial tree node $S_n$ corresponds to a spatial region formed by subdividing a spatial region corresponding to an $n-1^{th}$ level spatial tree node $S_{n-1}$. The highest level of spatial tree nodes are referred to herein as spatial tree leaf nodes $S_N$ and the nodes connecting the spatial tree leaf nodes $S_N$ to the spatial tree root node $S_1$ are referred to herein as spatial tree branch nodes $S_2 \ldots S_{N-1}$.

Every spatial tree node $S_n$ includes a time tree pointer 28 pointing to a root node of a unique respective time tree index 18.

Each time tree index 18 is pointed to by a corresponding spatial tree node $S_n$ and comprises a set of time tree nodes $T_m$ linked by pointers 27' into a hierarchical structure with M levels, where $1 \leq m \leq M$, including a time tree root node $T_1$, time tree branch nodes $T_2 \ldots T_{M-1}$ and time tree leaf nodes $T_M$. Each time tree node $T_m$ corresponds to a time period such as, for example, a year, a day, an hour, a minute, a second, a milliseconds, a microsecond, a nanosecond, a picosecond or ranges thereof. Hereinafter, where reference is made to a period, it should be taken to refer to a time period as described hereinbefore. Each $m^{th}$ level time tree node $T_m$ corresponds to a time period formed by subdividing a time period corresponding to an $m-1^{th}$ level time tree node $T_{m-1}$. Each time tree leaf node $T_M$ of each time tree index 18 includes a list of source pointers 31 to one or more primary data records 7 having time data included within the time period corresponding to the time tree leaf node $T_M$ and location data included within the spatial region corresponding to the respective spatial tree node $S_n$.

Thus, each primary data record 7 is indexed by a respective time tree index 18 corresponding to every spatial tree node $S_n$ which corresponds to a spatial region including the respective location data 8. Each primary data record 7 is indexed by time tree indexes 18 corresponding to one of the spatial tree leaf nodes $S_N$, the spatial tree root node $S_1$ and to every spatial tree branch node $S_2 \ldots S_{N-1}$ connecting the respective spatial tree leaf node $S_N$ to the spatial tree root node $S_1$. The time tree index 18 corresponding to the spatial tree root node $S_1$ indexes each of the primary data records 7. Further examples of the generation and structures of the spatial tree index 17 and the time tree indexes 18 are described hereinafter.

The data record aggregation module 13 may generate aggregated data records 19 based on subsets of the primary data records 7. The data record aggregation module 13 generates aggregated data records based on the spatial tree index 17, the time tree indexes 18 and the primary data table 16. For example, for each given time tree node $T_m$ of each time tree index 18, the data record aggregation module 13 may determine the subset of primary data records 7 having time data 9 within the time period corresponding to the given time tree node $T_m$ and location data 8 within the spatial region corresponding to the respective spatial tree node $S_n$. The data record aggregation module 13 may produce aggregated data records 19 corresponding to each given time tree node $T_m$ or, alternatively, the data record aggregated module 13 may only produce aggregated data records 19 corresponding to distinct subsets of primary data records 7. For example, if an $m^{th}$ level time tree node $T_m$ represents an hour and corresponds to a particular subset of primary data records 7, and the respective $m-1^{th}$ level time tree node $T_{m-1}$ represents a day, but does not correspond to any additional primary data records 7, the data record aggregation module 13 need not generate a second aggregated data record 19.

The measurement data 10 may be radio spectrum data including measured values of signal power at respective given frequencies, and aggregating primary data records 7 may include calculating summary statistics of the measured signal powers at each given frequency. Aggregating measurement data 10 may comprise processes such as, for example, calculating a mean, a median, a mode, a sum, a standard deviation, a range, a maximum, a minimum and/or a set of specified percentile values. Aggregating may also include determining parameters of a mathematical model such that the model provides the best fit to, or has the minimum sum of squared deviations from, the measured values of signal power for the subset of primary data records 7. The measurement data 10 need not be radio spectrum data and may be other types of numerical data suitable for aggregation such as, for example, temperature, magnetic field etc. Some types of measurement data 10 may require using aggregation processes specifically suited to the respective data type. For example, if the measurement data 10 comprises image data then aggregation may involve producing a collage of several images, or using the image data to generate histograms which may be aggregated. Producing a collage of several images may involve filtering and/or reducing the resolution of the individual images which are aggregated. Alternatively, image data may be analysed using feature extraction process to produce coordinates, vector maps or other parameters which are suitable for aggregating. If the measurement data 10 is audio recordings, then aggregation may involve multiplexing multiple audio tracks into a single track, or obtaining frequency spectra of the audio tracks which may then be aggregated. Another alternative is to analyse audio tracks using speech recognition methods to produce textual data for aggregating. Some types of measurement data may not be suitable for aggregation. Further examples of aggregating subsets of primary data records 7 are described hereinafter.

When the data record aggregation module 13 is used in the generation of the processed database 4, the aggregated data table formatting module 14 receives aggregated data records 19 from the data record aggregation module 13 and generates an aggregated data table 20 holding the aggregated data records 19. The index generation module 12 may additionally update every time tree node $T_m$ belonging to each of the time tree indexes 18 to include a data pointer 21. If a given time tree node $T_m$ corresponds to a single primary data record 7, then the data pointer 21 is initialised to point to the single primary data record 7. If a given time tree node $T_m$ corresponds to a subset of two or more primary data records 7, then the data pointer 21 is initialised to point to a location in the aggregated data table 20 holding an aggregated data record 19 corresponding to that subset of primary data records 7.

The data record down-sampling module 15 may generate down-sampled data records 22 corresponding to each of the primary and/or aggregated data records 7, 19. The data record down-sampling module 15 may generate a down-sampled data table 23 holding the down-sampled data records 22. When the data record down-sampling module 15 is used in the generation of the processed database 4, the index generation module 12 may additionally update every time tree node $T_m$ which already includes a pointer to a given primary and/or aggregated data record 7, 19 to include one or more down-sampled data pointers 24. Each down-sampled data pointer 24 is initialised to point to a down-sampled data record 22 corresponding to a respective primary and/or aggregated data record 7, 19 pointed to by the time tree node $T_m$. Alternatively, separate down-sampled data pointers 24 need not be used if the processed database 4 is stored in files with fixed regular structures. In such an example, the down-sampled data records 22 may be stored with a fixed offset relative to the respective data records 7, 19, or the offset to a down-sampled data record may be proportional to the offset to the respective data record 7, 19.

The measurement data 10 may be radio spectrum data in the form of measured values of signal power at respective given frequencies, and down-sampling may involve aggregating signal powers within each of a number of frequency bins to produce a down-sampled spectrum in the form of aggregated signal powers at respective bin central frequencies. Down sampling be performed by calculating a maximum, a minimum or any other suitable aggregation process described herein with reference to aggregating the measurement data 10 of several primary data records 7. The measurement data 10 need not be radio spectrum data and down-sampling may involve processes specifically suited to the respective data type. For example, if the measurement data 10 comprises image data then down-sampling may involve reducing the image resolution or compressing the image. If the measurement data comprises audio recordings then down-sampling may involve reducing the bit rate or application of an audio compression codec. Some types of measurement data may not require, or may not be suitable for down-sampling. For example, if the measurement data 10 of each primary data record 7 is a single value.

The down-sampled data records 22 need not be written to a separate down-sampled data table 23, and may be written to the primary and/or aggregated data tables 16, 20. For example, down-sampled data records 22 corresponding to primary data records 7 could be written to the primary data table 16 and down-sampled data records 22 corresponding to aggregated data records 19 could be written to the aggregated data table 20. Further examples of down-sampling primary and/or aggregated data records 7, 18 are described hereinafter.

The processed database 4 receives and stores the spatial tree index 17, the time tree indexes 18 and the primary data table 16. The processed database 4 may also store the aggregated data table 20 and/or the down-sampled data table 23. The processed database 4 preferably stores the indexes 17, 18 and data tables 16, 20, 23 in a single file. However, the processed database may store the indexes 17, 18 and data tables 16, 20, 23 in several separate files. The processed database 4 preferably stores the index 17, 18 and the data tables 16, 20, 23 in files having a fixed structure. A fixed structure means that the database files can be accessed using memory mapping, and each successive index node or data record 7, 19, 22 may be accessed using offsets of fixed size.

Method of Processing Primary Data Records 7

Figure 3:
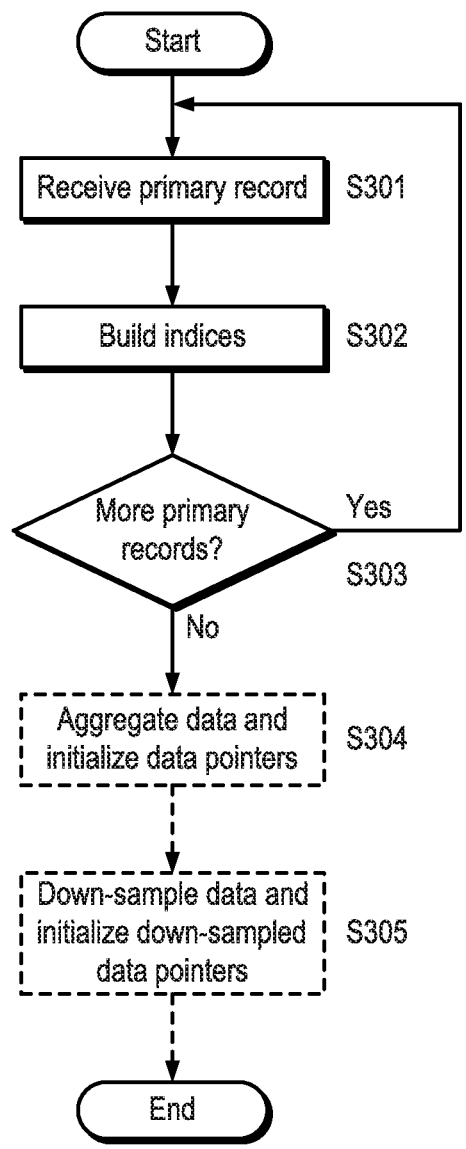
FIG. 3 is a process flow diagram of a method carried out by the data pre-processing module.

FIG. 3, illustrates a method carried out by the data pre-processing module 3.

Referring to FIG. 3, the primary data table formatting module 11 receives a primary data record 7 and writes it to the primary data table 16 (step S301).

The index generation module 12 receives the primary data record 7 and builds the spatial tree index 17 and time tree indexes 18. The time tree index 18 pointed to by each spatial tree node $S_n$ which corresponds to a spatial region including the location data 8 of the primary data record 7 is updated (step S302). Time tree indexes 18 corresponding to the spatial tree root node $S_1$, one of the spatial tree leaf nodes $S_N$ and every spatial tree branch node $S_2 \ldots S_{N-1}$ connecting the spatial tree leaf node $S_N$ to the spatial tree root node $S_1$ will be updated to build the indexes 17, 18. If a spatial tree node $S_n$ corresponding to a spatial region containing the location data 8 does not already exist in the spatial tree index 17, then that spatial tree node $S_n$ is created.

Each time tree index 18 pointed to by a spatial tree node $S_n$ corresponding to a spatial region containing the location data 8 is updated by adding a pointer to the primary data record 7 to the respective time tree leaf node $T_M$ corresponding to the time period including the time data 9. If the respective time tree leaf node $T_M$ to be updated does not exist in the time tree index 18, then the respective time tree leaf node $T_M$ is created, and respective time tree branch nodes $T_2 \ldots T_{M-1}$ and the respective time tree root node $T_M$ are created or updated as required to connect the respective time tree leaf node $T_M$ to the respective time tree root node $T_1$. Further examples of building the spatial tree index 17 and the time tree indexes 18 are described hereinafter.

The data pre-processing module 3 checks whether there are more primary data records 7 to be indexed (step S303). If there are more primary data records 7 to be indexed, then the next primary data record 7 is received and the indexing repeated (step S301). If there are no further primary data records 7 then the indexing is completed. If the processed database 4 is intended to include the aggregated data table 20 and/or the down-sampled data table 23, then aggregation (step S304) and/or down-sampling (step S305) processes may be conducted.

The data record aggregation module 13 and aggregated data table formatting module may generate the aggregated data records 19 and the aggregated data table 20. The index generation module 12 may add data pointers 21 to each time tree node $T_m$ belonging to each of the time tree indexes 18 (step S304). Further examples of the aggregation of subsets of primary data records 7 are described hereinafter.

The data record down-sampling module 15 may receive the primary and/or aggregated data records 7, 19 and generate a set of down-sampled data records 22 and the down-sampled data table 23. The index generation module 12 may add down-sampled data pointers 24 to each time tree node $T_m$ which already points to a primary and/or aggregated data record 7, 19 (step S305). Further examples of down-sampling data records 7, 19 are described hereinafter.

Data Analysis Server 5 and Searching

Figure 4:
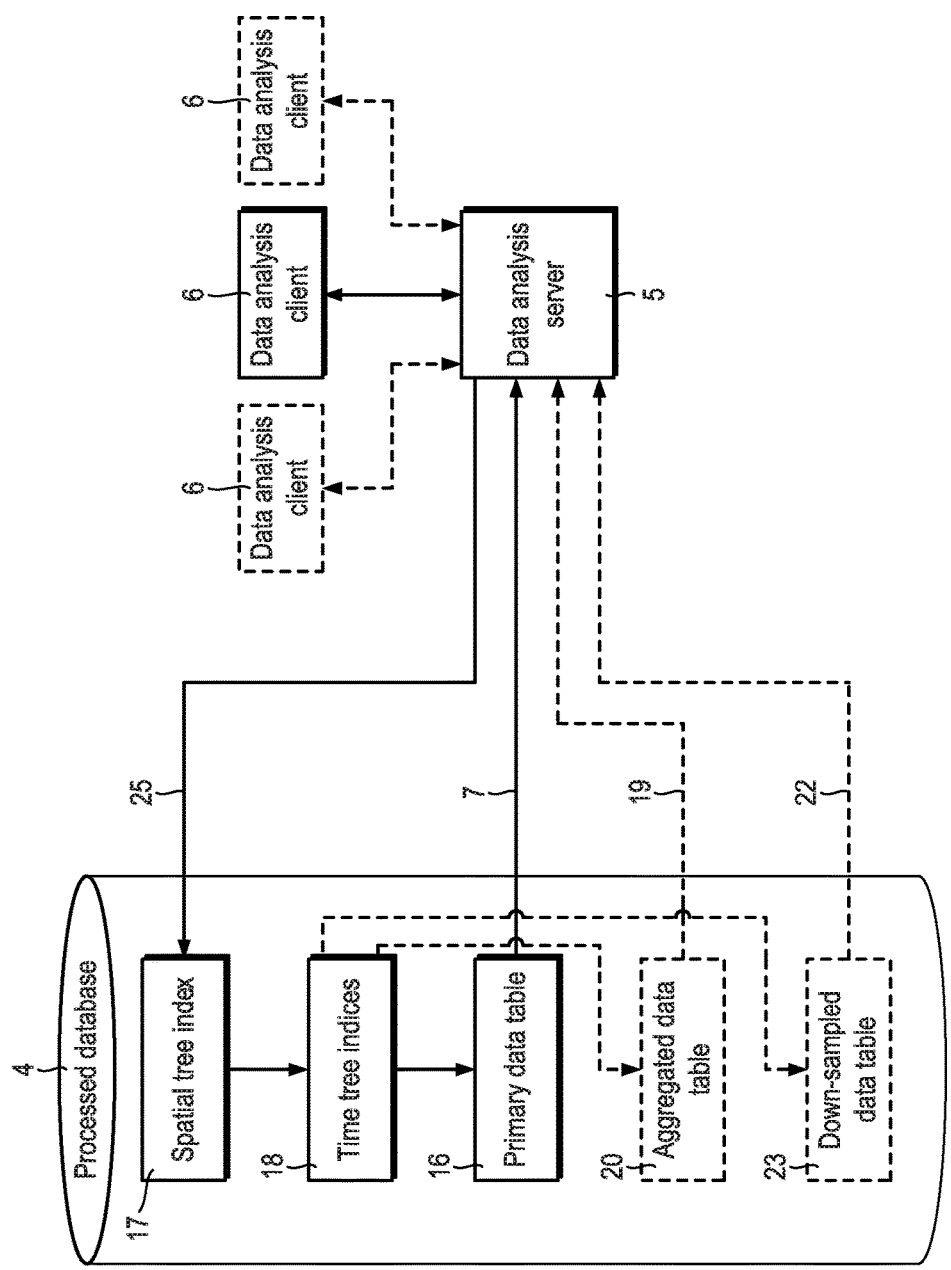
FIG. 4 is a schematic block diagram illustrating the relationship between the processed database and the data analysis server.
Figure 5:
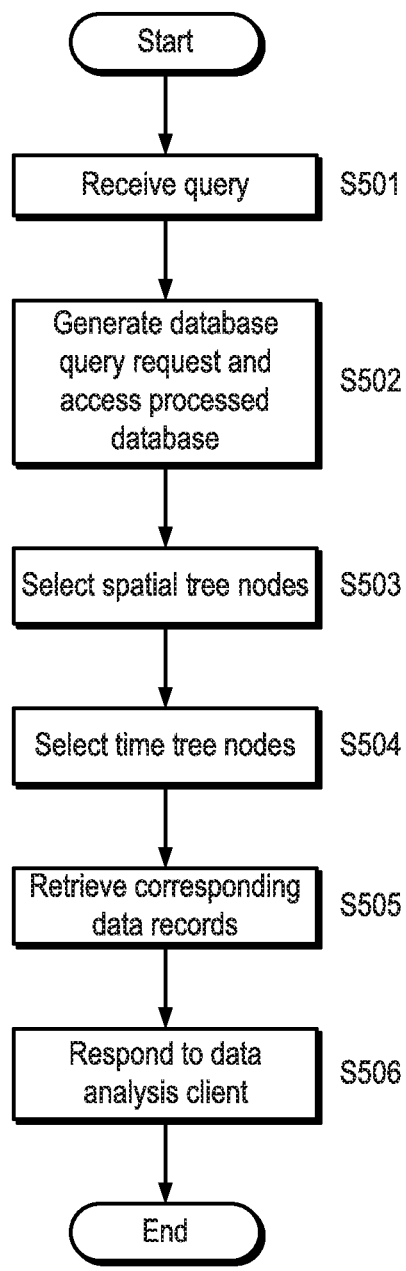
FIG. 5 is a process flow diagram of a method of searching the processed database.

FIG. 4 shows the relationship between the data analysis server 5 and the processed database 4 is shown in more detail. FIG. 5 is a process flow diagram of a method of searching the processed database 4.

Referring to FIGS. 4 and 5, the data analysis server 5 receives a query from a data analysis client 6 which includes at least queried spatial region information and queried time period information (step S501). The queried spatial region information may also specify a spatial scale. The query may also include a maximum number of data records 7, 19, 22 (i.e. to limit the spatial scale indirectly). Thus, the query may be structured to allow efficient and effective visualisation and display of the measurement data 10 corresponding to large numbers (e.g. thousands, tens of thousands, millions or more) of primary data records 7.

The data analysis server 5 generates a database query request 25 including at least the queried spatial region information and the queried time period information and accesses the processed database 4 (step S502).

The spatial tree index 17 is searched and one or more spatial tree nodes $S_n$ may be selected based on the queried spatial region information (step S503).

The time tree indexes 18 corresponding to the selected spatial tree nodes $S_n$ are searched and one or more time tree nodes $T_m$ may be selected from each time tree index 18 based on the queried time period information (step S504).

The data analysis server 5 drills down to the time tree leaf nodes $T_M$ which descend from each of the selected time tree nodes $T_m$ to obtain a list of pointers to every primary data record 7 having location data 8 corresponding to the queried spatial region and time data 9 corresponding to the queried time period. The data analysis server 5 uses the list of pointers obtained to retrieve the set of primary data records 7 having location data 8 corresponding to the queried spatial region and time data 9 corresponding to the queried time period (step S505).

Alternatively, if the processed database 4 includes the aggregated data table 20, then the data analysis server 5 may retrieve the primary data records 7 and/or aggregated data records 19 pointed to by the respective data pointers 21 of each selected time tree node $T_m$, instead of drilling down to the time tree leaf nodes $T_M$. If requested by the data analysis client 6, the data analysis server 5 may retrieve both the data records 7, 21 pointed to by the data pointers 21 and also the set of every primary data record 7 having location data 8 within the queried spatial region and time data 9 within the queried time period. If the processed database 4 includes the down-sampled data table 23, then the data analysis server 5 may additionally, or alternatively, obtain the respective down-sampled data records 22 corresponding to the selected time tree nodes $T_m$.

The data analysis server 5 may supply the retrieved data records 7, 19, 22 directly to the data analysis client 6 which originated the query (step S506). Alternatively, the data analysis server 5 may conduct additional processing such as, for example, aggregating the retrieved data records 7, 19, 22 or preparing a report based on the retrieved data records 7, 19, 22. Further examples of querying the processed database 4 and retrieving data records 7, 19, 22 are described hereinafter.

Spatial Tree Index 17

Referring to FIG. 6 a schematic example of a spatial tree index 17 is shown.

The spatial tree root node $S_1$ is a data object including at least a pointer list 27 and a time tree pointer 28. Spatial region data 26 may also be included. Spatial tree branch nodes $S_2 \ldots S_{N-1}$ and spatial tree leaf nodes $S_N$ have the same structure, except that the pointer list 27 for the spatial tree leaf nodes $S_N$ is empty. The pointer list 27 may be omitted for the spatial tree leaf nodes. The spatial region data 26 defines a set or range of locations corresponding to the spatial tree node $S_n$. The spatial region data 26 may be omitted if the spatial tree index 17 is a regular index so that the spatial region corresponding to a spatial tree node $S_n$ can be identified from the position of that spatial tree node $S_n$ within the spatial tree index 17. For example, a regular quad tree index as described hereinafter. The time tree pointer 28 of each spatial tree node $S_n$ points to the time tree root node $T_1$ of a unique respective time tree index 18. If a first node points to a second node at a higher level then the first node may be referred to as the parent node of the second node and the second node as the child node of the first node. A second node reachable by passing through a first node from the root node may be referred to as descendent from the first node.

The spatial tree index 17 may be a spatial quad tree index such that the pointer list 27 of an $n^{th}$ level spatial tree node $S_n$ may include up to four pointers to $n+1^{th}$ level spatial tree nodes $S_{n+1}$. However, the spatial tree index 17 need not be a quad tree index, and the pointer list may include more or fewer entries. The spatial index 17 could employ a different type of index structure such as, for example, an R tree, a B tree or variants thereof.

Figure 9A:
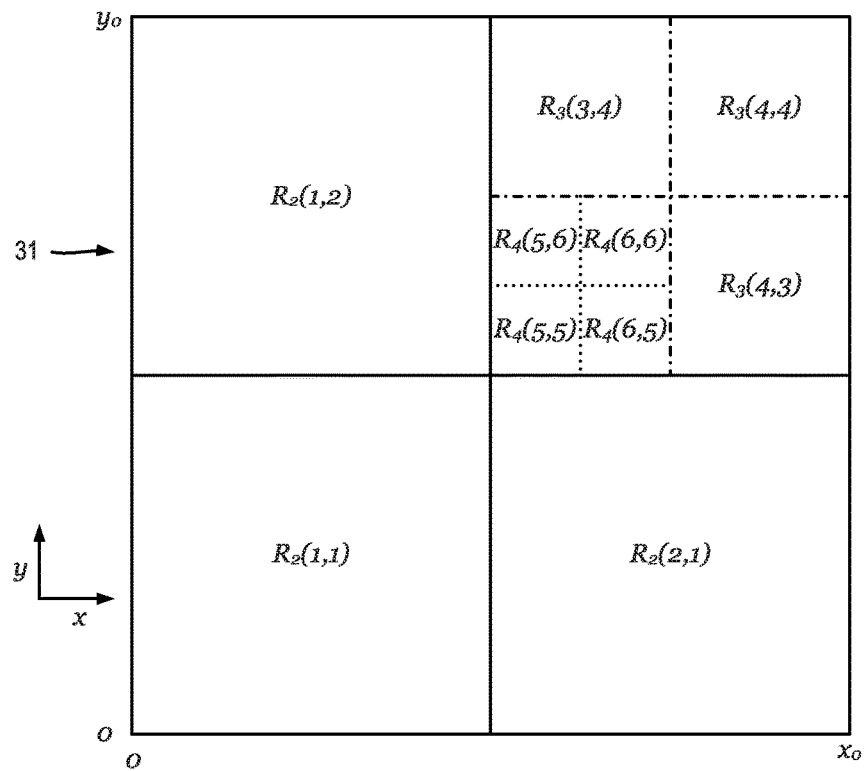
FIG. 9A illustrates dividing an overall spatial region into spatial regions used to generate spatial tree indexes.

Referring also to FIG. 9a, an example of the division of an overall spatial region 29 into spatial regions corresponding to each spatial tree node $S_n$ of the spatial tree index 17 is shown.

When the spatial index 17 is a quad tree index with a total of N levels, the individual $n^{th}$ level spatial tree nodes $S_n$, where $1 \leq n \leq N$, may be denoted as $S_n(k,j)$ where $1 \leq k \leq 2^{n-1}$ and $1 \leq j \leq 2^{n-1}$, such that the $n^{th}$ level of the spatial index 17 includes $4^{n-1}$ spatial tree nodes $S_n$ in total. In a quad tree index, the $n^{th}$ level spatial tree nodes $S_n$ correspond to spatial regions formed by dividing each spatial region of the $n-1^{th}$ level spatial tree nodes $S_{n-1}$ into quarters. In this way, each individual spatial tree node $S_n(k,j)$, corresponds to a spatial region, $R_n(k,j)$, which includes the set of locations given by:

$$R_n(k, j) = \left\{ (x, y) \;\middle|\; \frac{(k-1) \cdot x_0}{2^{n-1}} \leq x < \frac{k \cdot x_0}{2^{n-1}} \wedge \frac{(j-1) \cdot y_0}{2^{n-1}} \leq y < \frac{j \cdot y_0}{2^{n-1}} \right\} \quad (1a)$$

When k and j are both less than $2^{n-1}$. When k and/or j is equal to $2^{n-1}$, $R_n(k,j)$ is given by:

$$R_n(k, j) = \left\{ (x, y) \;\middle|\; \frac{(k-1) \cdot x_0}{2^{n-1}} \leq x \leq \frac{k \cdot x_0}{2^{n-1}} \wedge \frac{(j-1) \cdot y_0}{2^{n-1}} \leq y \leq \frac{j \cdot y_0}{2^{n-1}} \right\} \quad (1b)$$

In which $R_n(k,j)$ is the spatial region corresponding to the $n^{th}$ level spatial tree node $S_n(k,j)$, x and y are Cartesian coordinates and the overall spatial region 29 is a square with $0 \leq x \leq x_0$ and $0 \leq y \leq x_0$. In Equations 1a and 1b, the set of locations included in the spatial region $R_n(k,j)$ is expressed in set builder notation. All combinations of k and j for the $n^{th}$ spatial indexing level need not be used, since spatial tree nodes $S_n(k,j)$ may be omitted from the spatial tree index 17 if there are no primary data records 7 corresponding to the respective spatial region $R_n(k,j)$.

The overall spatial region 29 need not be square, and other shapes may be used such as, for example, a rectangle, a circle, or the surface of a sphere. The overall spatial region 29 may be an irregular shape such as, for example, the outline of the geographical area of a country or of a city or other such localities. The overall spatial region may be three dimensional. Cartesian coordinates need not be used to denote locations and delimit spatial regions, any suitable coordinate system which spans a particular overall spatial region 29 may be used. For example, if the overall spatial region is the entire planet Earth, then latitude and longitude may be used.

The total number of levels, N, in the spatial index 17 may be chosen so that the individual spatial leaf nodes $S_N(k,j)$ correspond to spatial regions $R_N(k,j)$ which provide a convenient spatial resolution. For example, N=20 results in the individual spatial leaf nodes $S_N(k,j)$ corresponding to spatial regions/areas of approximately 20 metres by 20 metres for an overall spatial region 29 which is the entire planet Earth. If there are no primary data records 7 which have location data 8 within a particular spatial region $R_n(k,j)$, then the respective individual spatial tree node $S_n(k,j)$ may be omitted from the spatial tree index 17.

Time Tree Indexes 18

Referring to FIGS. 7 and 8, a schematic example of a time tree index 18 corresponding to a respective spatial tree node $S_n$ is shown.

Each $m^{th}$ level time tree node $T_m$ is a data object including a pointer list 27. Each time tree node $T_m$ may also include time period data 30 defining a range of times corresponding to the time tree node $T_m$. The pointer list 27 for each time tree root node $T_1$ and each time tree branch node $T_2 \ldots T_{M-1}$ may each including up to $D_m$ pointers to $m+1^{th}$ level time tree nodes $T_{m+1}$, where $D_m$ is the degree of the $m^{th}$ level nodes. The $m^{th}$ level time tree nodes $T_m$ correspond to time periods formed by dividing each time period corresponding to the $m-1^{th}$ level time tree nodes $T_{m-1}$ into $D_{m-1}$ equal time periods. The time period data 30 may be omitted if the time tree indexes 18 are regular indexes, so that the time period corresponding to a given time tree node $T_m$ can be identified from the position of that time tree node $T_m$ within a time tree index 18. For example, if all of the $m^{th}$ level time tree node $T_m$ belonging to each time tree index 18 have the same degree $D_m$. The pointer list 27 for each time tree leaf node $T_M$ includes $N_{PR}$ source pointers 31 which point to primary data records 7, where $N_{PR}$ is the number of primary data records 7 having location data 8 and time data 9 corresponding to the time period data 30 of the time tree leaf node $T_M$ and the spatial region data 27 of the respective spatial tree node $S_n$. Each time tree node $T_m$ may also include spatial region data 27 defining the range of locations corresponding to the respective spatial tree node $S_n$. The time tree index 18 may alternatively employ a different type of index structure such as, for example, an R tree, a B tree or variants thereof.

If the processed database 4 includes an aggregated data table 20, then each time tree node $T_m$ may also include a data pointer 21 such that, if the subset of primary data records 7 having location data 8 and time data 9 corresponding to the time tree node Tm includes two or more primary data records then the data pointer 21 points to a corresponding aggregated data record 19 and, if the subset includes a single primary data record 7, then the data pointer 21 points to the single primary data record.

If the processed database 4 includes the down-sampled data table 23, then each time tree node $T_m$ may also include a down-sampled data pointer 24 pointing to a down-sampled data record 22 corresponding to the primary and/or aggregated data record 7, 19 pointed to by the respective data pointer 21. The pointer list 27 of each time tree leaf node $T_M$ may also include an additional down-sampled data pointer 24 corresponding to each source pointer 31 and pointing to down-sampled data records 22 corresponding to the $N_{PR}$ respective primary data records 7.

Figure 9B:
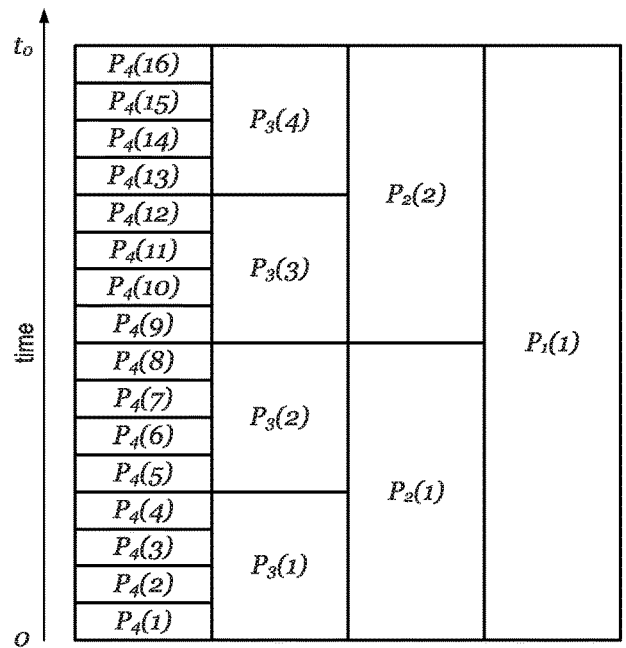
FIG. 9B illustrates dividing an overall time period into time periods used to generate time tree indexes.

Referring also to FIG. 9b, an example of the division of an overall time period 32 into time periods corresponding to each time tree node $T_m$ of the time tree indexes 18 is shown.

If an individual $m^{th}$ level time tree node $T_m$ corresponding to an $n^{th}$ level spatial tree node $S_n$ is denoted as $T_m(n,k,j,p)$, in which $1 \leq p \leq N_m$ where $N_m$ is given by the product over the degrees $D_m$ of the lower levels of time tree nodes, namely:

$$N_m = \begin{cases} \prod_{w=1}^{m-1} D_w & \text{if } m > 1 \\ 1 & \text{if } m = 1 \end{cases} \quad (2)$$

Where w is a dummy index used for summation over the degrees $D_m$ of time tree nodes $T_m$. The parameters n, k and j reflect that each individual time tree node $T_m(n,k,j,p)$ belongs to a separate time tree index 18 which corresponds to an individual spatial tree node $S_n(k,j)$. The $m^{th}$ level time tree nodes $T_m$ may correspond to time periods formed by dividing each time period corresponding to the $m-1^{th}$ level time tree nodes $T_{m-1}$ into a number of time periods equal to the degree $D_{m-1}$ of the $m-1^{th}$ level nodes. In this way, each individual time tree node $T_m(n,k,j,p)$, corresponds to a spatial region $R_n(k,j)$ corresponding to the individual spatial tree node $S_n(k,j)$ and a time period $P_m(p)$ including a range of times given by:

$$P_m(p) = \left\{ t \mid \frac{(p-1) \cdot t_0}{N_m} \leq t < \frac{p \cdot t_0}{N_m} \right\} \quad (3)$$

In this example, the overall time period 32 is given by $1 \leq t \leq t_0$. However, the overall time period may span any arbitrary period of time. It should be noted that each separate time tree index 18 includes time tree nodes $T_m$ which map to the same time periods $P_m(p)$. All possible values of p for the $m^{th}$ temporal indexing level need not be used, since time tree nodes $T_m(n,k,j,p)$ may be omitted from the time tree indexes 18 if there are no primary data records 7 corresponding to the respective time region $P_m(p)$.

The total number of levels of the time tree indexes 18, and the degrees $D_m$ of the nodes, may be chosen to provide a desired precision of temporal indexing, for example, the time tree indexes 18 may correspond to an overall time period of a year, and include six levels, M=6, corresponding to the year at level m=1, weeks at level m=2, days at level m=3, hours at level m=4, minutes at level m=5 and seconds at level m=6, with respective degrees $D_1=52$, $D_2=7$, $D_3=24$, $D_4=60$ and $D_5=60$. Time tree leaf nodes $T_M$ do not point to further time tree nodes $T_m$ and thus do not have a defined degree $D_m$.

In the example shown in FIG. 9b, the overall time period 32 is indexed by time tree indexes 18 with four levels, M=4, and the degrees $D_m$ of the time tree nodes are given by $D_1=2$, $D_2=2$ and $D_3=4$. However, the time tree indexes 18 need not have the structure described above and in general may include more or fewer levels M and include nodes having degrees $D_m$ which are larger or smaller. The degree $D_m$ of each node at the $m^{th}$ level need not be identical, and nodes at the $m^{th}$ level may have different degrees $D_m$ such that, for example, if the $m^{th}$ level corresponds to months and the $m+1^{th}$ level to days, then time tree nodes $T_m$ corresponding to November and July would have degrees $D_m$ of 30 and 31 respectively. The degree $D_m$ of time tree nodes $T_m$ may be dependent on the parent time tree nodes $T_{m-1}$. For example, if the $m^{th}$ level corresponds to months and the $m-1^{th}$ level to years, then the degree $D_m$ of an $m^{th}$ level node $T_m$ corresponding to February would be twenty eight or twenty nine depending on whether the parent $m-1^{th}$ level node $T_{m-1}$ corresponds to a leap year.

The time tree leaf nodes $T_M$ include a list of source pointers 31. However, listing of source pointers 31 need not be restricted to the time tree leaf nodes $T_M$ and other time tree nodes may additionally include lists of source pointers 32. For example, every individual time tree node $T_m(N,k,j,p)$ belonging to a time tree index 18 corresponding to a respective spatial tree leaf node $S_N$ may include a list of source pointers 31 pointing to every primary data record 7 having location data 8 within the corresponding spatial region $R_N(k,j)$ and time data 9 within the corresponding time period $P_m(p)$. If rapid retrieval of individual primary data records 7 is required at every level of the spatial tree index 17, then every time tree root or branch node $T_1 \ldots T_{M-1}$ may additionally include a list of source pointers 31 pointing to the corresponding primary data records 7.

Building Spatial and Time Tree Indexes 17, 18

Figure 10:
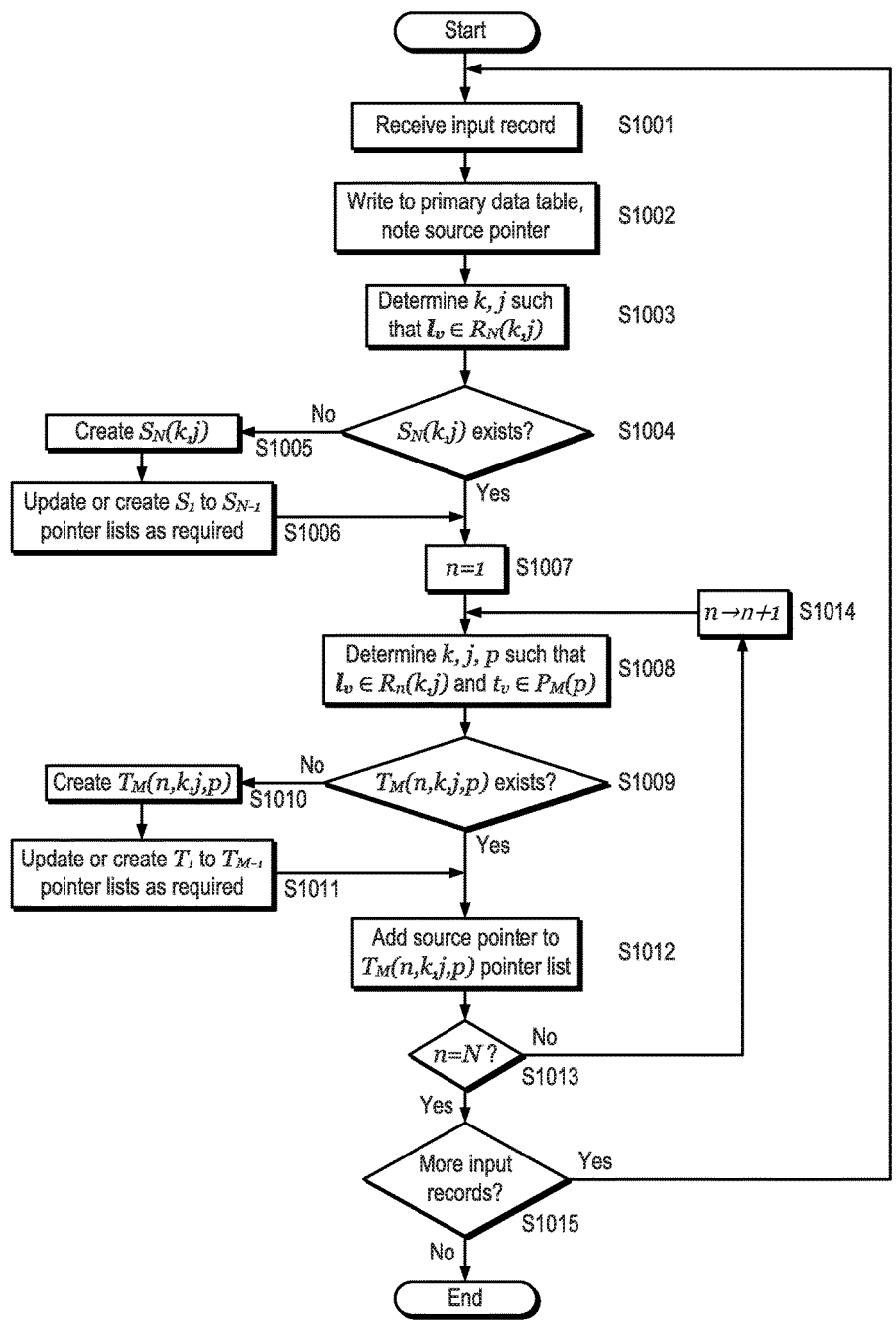
FIG. 10 is a process flow diagram of a method of generating spatial and time tree indexes.

Referring to FIG. 10, a process flow diagram of an example method of building the spatial tree index 17 and the time tree indexes 18 is shown.

The $v^{th}$ individual primary data record 7 is denoted as $E_v$, where $1 \leq v \leq N_T$ and $N_T$ is the total number of primary data records 7 stored in the unprocessed data record storage 2. The location data 8 of the individual primary data record $E_v$ is denoted $l_v=(x_v,y_v)$ and the time data 9 of the individual primary data record $E_v$ is denoted $t_v$ such that $E_v \equiv E_v(l_v, t_v)$.

An individual primary data record $E_v$ is received (step S1001). The individual primary data record $E_v$ is written to the primary data table 16 and a source pointer 31 pointing to the location of the primary data table 16 holding the individual primary data record $E_v$ is noted and temporarily stored (step S1002).

The $N^{th}$ level leaf spatial region $R_N(k,j)$ which includes the location data $l_v$ of the individual primary data record $E_v$ is determined (step 1003). In other words, k and j are determined such that $l_v$ belongs to the set of locations $R_N(k,j)$. The existence of a spatial tree leaf node $S_N(k,j)$ corresponding to the respective leaf spatial region $R_N(k,j)$ is checked (step 1004). If the respective spatial tree leaf node $S_N(k,j)$ already exists in the spatial tree index 17 then the process of updating the time tree indexes begins (step S1007).

However, if the respective spatial tree leaf node $S_N(k,j)$ does not already exist in the spatial tree index 17 then it will be created (step S1005). Next, any spatial tree branch nodes $S_2 \ldots S_{N-1}$ which correspond to spatial regions containing the location data $l_v$ of the individual primary data record $E_v$ are created and/or the respective pointer lists 27 updated as required to connect the created spatial tree leaf node $S_N(k,j)$ to the spatial tree root node $S_1$ (step S1006) The pointer list 27 of the spatial tree root node $S_1$ may also be updated if a new $2^{nd}$ level spatial tree branch node $S_2$ has been created. If the individual primary data record $E_v$ is the first primary data record 7, then the spatial tree root node $S_1$ itself may also be created. Next, the process of updating the time tree indexes begins (step S1007).

For example, in a square overall spatial region 31 with N=4 levels of spatial regions $R_n(k,j)$ (FIG. 9a). If a spatial tree index 17 already includes a spatial tree root node $S_1(1,1)$ and spatial tree branch nodes $S_2(1,2)$, $S_2(1,1)$ and $S_2(2,1)$, and an individual primary data record $E_v$ is indexed which has location data $l_v$ contained within the $4^{th}$ level spatial region $R_4(5,5)$. In such an example, the following changes would be made when updated the spatial tree index 17 (steps S1004 to 1006):
1. the spatial tree leaf node $S_4(5,5)$ would be created;
2. the spatial tree branch node $S_3(3,3)$ would be created and its pointer list 27 updated to include a pointer to the spatial tree leaf node $S_4(,5,5)$;
3. the spatial tree branch node $S_2(2,2)$ would be created and its pointer list 27 updated to include a pointer to the spatial tree branch node $S_3(3,3)$;
4. the pointer list 27 of the spatial tree root node $S_1(1,1)$ would be updated to include a pointer to the spatial tree branch node $S_2(2,2)$.

A more detailed example of building indexes for an example set of primary data records 7 is described hereinafter.

A looped process updates each time tree index 18 which corresponds to a spatial region $R_n(k,j)$ containing the location data $l_v$ of the individual primary data record $E_v$, starting with the time tree index 18 corresponding to the spatial tree root node $S_1(1,1)$ (step S1007).

The spatial region $R_n(k,j)$ at the $n^{th}$ spatial indexing level which contains the location data $l_v$ of the individual primary data record $E_v$ is determined, and the $M^{th}$ level time period $P_M(p)$ containing the time data $t_v$ of the individual primary data record $E_v$ is determined (step S1008). In other words, the values of k, j and p are determined for the $n^{th}$ spatial level such that $l_v$ belongs to the set of locations $R_n(k,j)$ and $t_v$ belongs to the set of times $P_M(p)$. The existence of a time tree leaf node $T_M(n,k,j,p)$ corresponding to the respective spatial region $R_n(k,j)$ and the respective leaf time period $P_M(p)$ is checked (step S1009). If the respective time tree leaf node $T_M(n,k,j,p)$ exists then the pointer list 27 of the time tree leaf node $T_M(n,k,j,p)$ is updated (step S1012).

However, if the respective time tree leaf node $T_M(n,k,j,p)$ does not exist, then time tree leaf node $T_M(n,k,j,p)$ is created (step S1010). Next, any time tree branch or root nodes $T_1(n,k,j,p) \ldots T_{M-1}(n,k,j,p)$ belonging to the time tree index 18 corresponding to the respective spatial tree node $S_n(k,j)$ are created and/or the respective pointer lists 27 updated as required to connect the created time tree leaf node $T_M(n,k,j,p)$ to the time tree root node $T_1(n,k,j,1)$ (step S1011). It should be noted that the particular value of p, where $1 \leq p \leq N_m$, will in general not be the same for each of the time tree nodes $T_1(n,k,j,p) \ldots T_M(n,k,j,p)$ created and/or updated when adding a given primary data record $E_v$ to a time tree index 18. If the individual primary data record $E_v$ is the first primary data record 7 to have location data 8 corresponding to the respective spatial tree node $S_n(k,j)$, then the time tree root node $T_1(n,k,j,1)$ is created and the time tree pointer 28 of the respective spatial tree node $S_n(k,j)$ is set to point to the time tree root node $T_1(n,k,j,1)$. Next, the pointer list 27 of the time tree leaf node $T_M(n,k,j,p)$ is updated (step S1012).

The pointer list 27 of the time tree leaf node $T_M(n,k,j,p)$ corresponding to the respective spatial region $R_n(k,j)$ and the respective $M^{th}$ level time period $P_M(p)$ is updated to include an additional source pointer 31 (step S1012). The new source pointer 31 is initialised to point to the location of the primary data table 16 holding the individual primary data record $E_v$.

Next, it is checked whether the time tree indexes 18 corresponding to every level of spatial indexing have been updated, i.e. if n=N (step S103). If there are further time tree indexes 18 to update then the spatial indexing level is incremented from the $n^{th}$ level to the $n+1^{th}$ level (step S1014) and the process of updating the time tree indexes continues (step S1008).

If there are no further time tree indexes 18 to update, then it is determined whether there are further primary data records 7 to add to the indexes (step S1015). If there are further primary data records 7 to index then the next individual primary data record $E_{v+1}$ is received and the indexing process repeated (step S1001). If there are no further primary data records 7 to process, then the indexing method has finished.

Once the spatial tree index 17 and the time tree indexes 18 have been generated, further processes such as aggregation to produce the aggregated data records 19 and/or down-sampling to produce the down-sampled data records 22 may be carried out if desired, and the time tree nodes $T_m$ updated to include further data pointers 21 to primary/aggregated data records 7, 19 and/or down-sampled data pointers 24 to down-sampled data records 22.

The example method described above can be applied to process a set of primary data records 7 and generate a spatial tree index 17 and a set of time tree indexes 18 and could equally be applied to update existing indexes 17, 18 to append one or more further primary data records 7 to an existing processed database 4. However, the method used to generate the indexes 17, 18 may alternatively involve completely re-building the indexes 17, 18 when further primary data records are added to the unprocessed data record storage 2.

Specific Example of Building Spatial/Time Tree Indexes 17, 18

To further illustrate the hereinbefore explained method of generating spatial index 17 and time tree indexes 18, the method shall be applied to a particular example of twenty four individual primary data records $E_1 \ldots E_{24}$.

Figure 12:
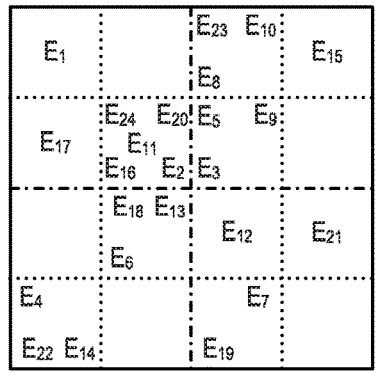
FIG. 12 schematically illustrates the spatial distribution of primary data records for the example shown in FIG. 11.

FIGS. 11a to 11h show an overall spatial region 29 at eight equally spaced points in time, corresponding to eight time periods $P_4(1)$ to $P_4(8)$ which span an overall time period 32. FIG. 12 shows the overall spatial distribution of the primary data records $E_1 \ldots E_{24}$ within the overall spatial region 29.

Referring to FIGS. 11a to 11h and 12, the spatial tree index 17 and the time tree indexes 18 may be generated using the hereinbefore described method (FIG. 10). In this example, the spatial tree index 17 is a quad tree with N=3 levels and the time tree indexes 18 have M=4 levels and all the root and branch nodes have the same degree $D_m=2$.

Figure 13:
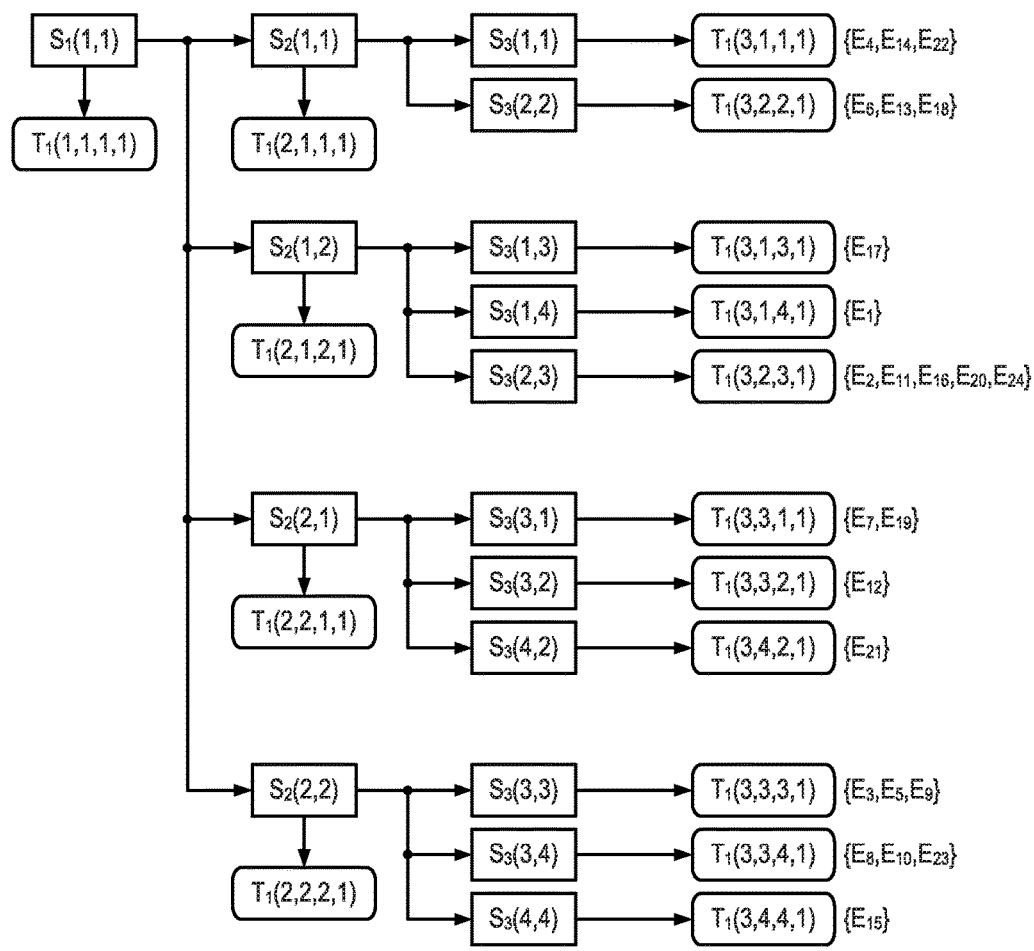
FIG. 13 schematically illustrates a spatial tree index generated for the example shown in FIG. 11.
Figure 14:
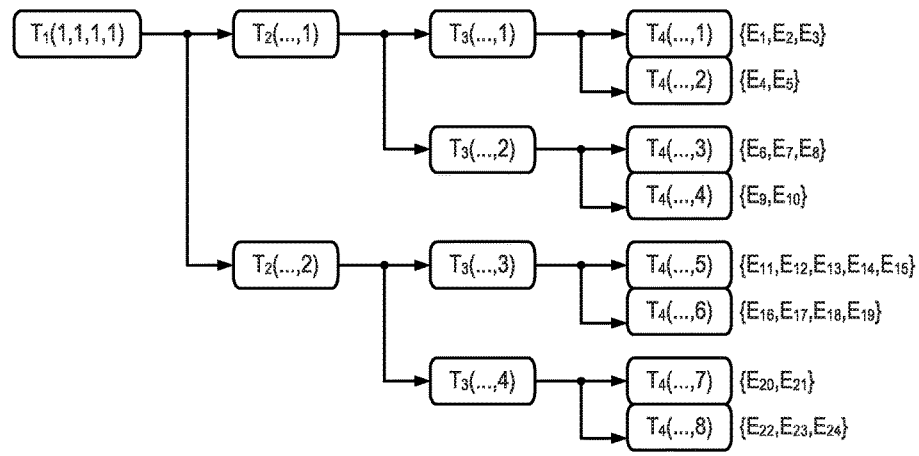
FIG. 14 schematically illustrates a time tree index corresponding to the spatial tree root node of the spatial tree index shown in FIG. 13.
Figure 15A:
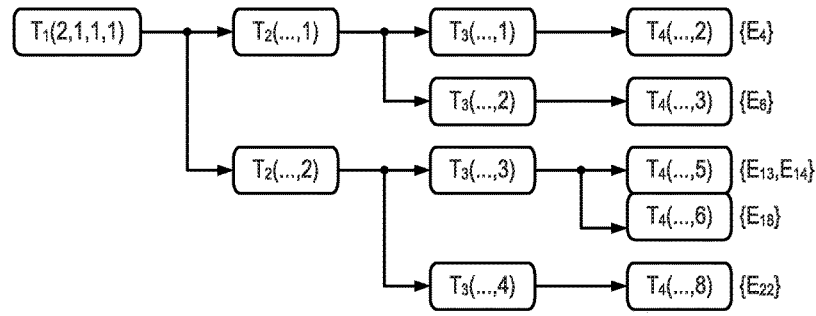
FIGS. 15A-15D schematically illustrate time tree indexes corresponding to the level two spatial tree branch nodes of the spatial tree index shown in FIG. 13.
Figure 15B:
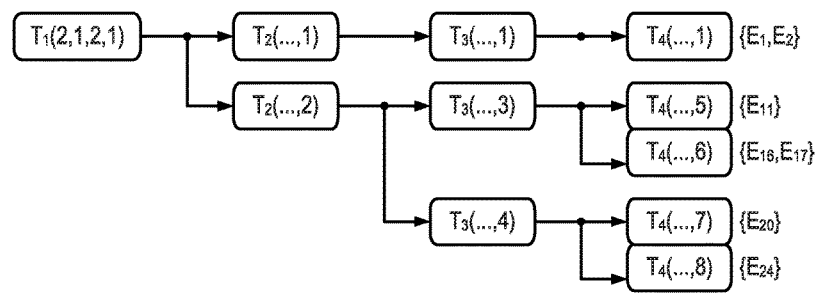
Figure 15C:
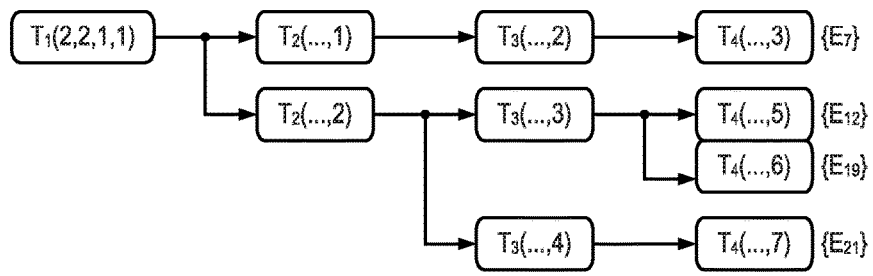
Figure 15D:
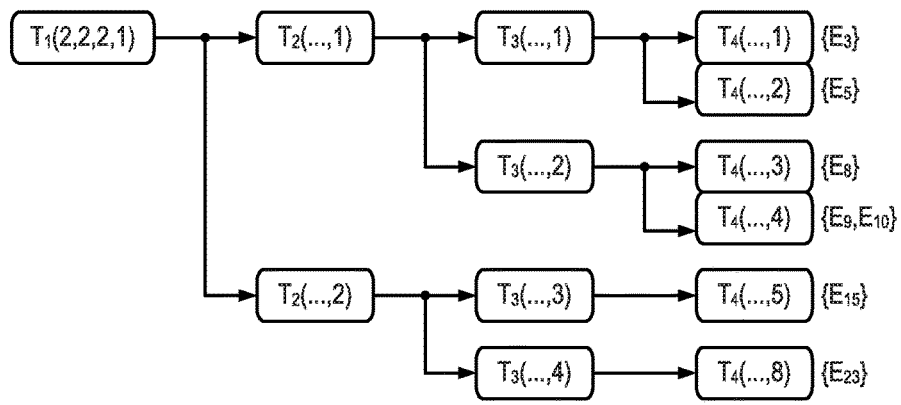
Figure 16C:
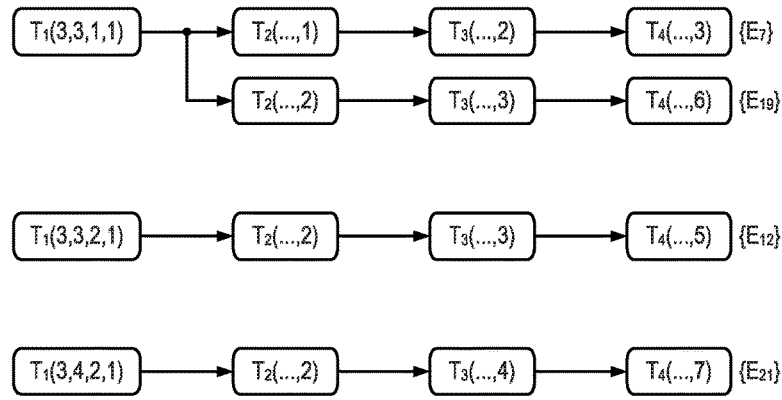
Figure 16D:
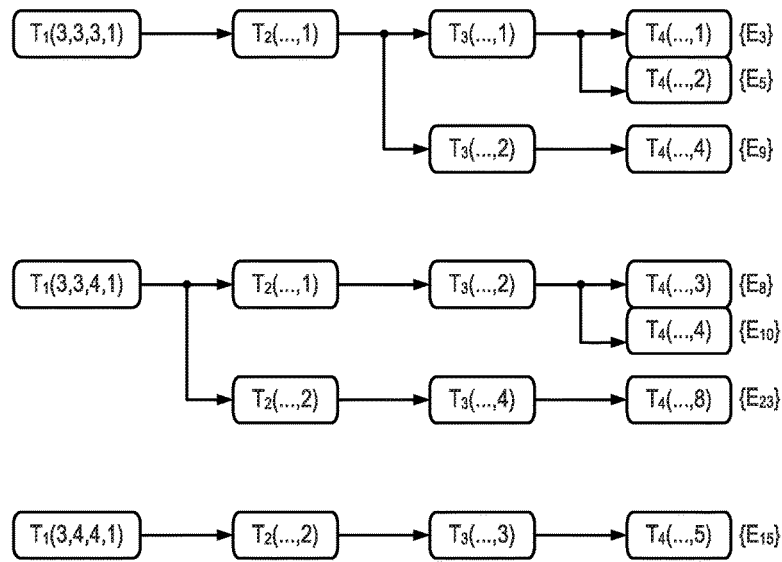

FIG. 13 shows the spatial tree index 17 generated for the primary data records $E_1 \ldots E_{24}$. FIGS. 14, 15 and 16 show time tree indexes 18 generated corresponding to the first $S_1$, second $S_2$ and third $S_3$ levels of spatial tree nodes respectively.

Referring also to FIGS. 13 to 16. Starting with a first primary data record $E_1$, the spatial tree leaf node $S_3(1,4)$ is created. Additionally, spatial tree branch node $S_2(1,2)$ is created and its pointer list 27 is updated to point to the spatial tree leaf node $S_3(1,4)$, and spatial tree root node $S_1(1,1)$ is also created and its pointer list 17 is updated to point to the spatial tree branch node $S_2(1,2)$. Next, the time tree indexes 18 corresponding to each spatial tree node $S_n$ corresponding to the first primary data record $E_1$ must be updated. Starting with the time tree index 18 corresponding to the spatial tree root node $S_1(1,1)$ (see FIG. 14), the time tree leaf node $T_4(1,1,1,1)$ is created and its pointer list 27 is updated to include a source pointer 31 pointing to the first primary data record $E_1$. The time tree branch nodes $T_3(1,1,1,1)$ and $T_2(1,1,1,1)$ are created and the respective pointer lists 27 are updated. The time tree root node $T_1(1,1,1,1)$ is created and its pointer list 27 is updated. The time tree pointer of the spatial root node $S_1(1,1)$ is updated to point to the corresponding time tree root node $T_1(1,1,1,1)$. Next, the time tree index 18 corresponding to spatial tree branch node $S_2(1,2)$ (see FIG. 15b) is updated by creating time tree leaf node $T_4(2,1,2,1)$ and adding a source pointer 31 to the first primary data record $E_1$ to its pointer list 27, creating time tree branch nodes $T_3(2,1,2,1)$ and $T_2(2,1,2,1)$ and time tree root node $T_1(2,1,2,1)$, connecting the created nodes by updated the respective pointer lists 27 and updating the time tree pointer of the spatial tree branch node $S_2(1,2)$ to point to the corresponding time tree root node $T_1(2,1,2,1)$. Next, the time tree index 18 corresponding to spatial tree leaf node $S_3(1,4)$ (see FIG. 1a) is updated by creating the time tree nodes $T_4(3,1,4,1)$, $T_3(3,1,4,1)$, $T_2(3,1,4,1)$ and $T_1(3,1,4,1)$, updating the respective pointer lists 27 and updating the time tree pointer 28 for the spatial tree leaf node $S_3(,1,4)$ to point to the corresponding time tree root node $T_1(3,1,4,1)$.

Once the first primary data record $E_1$ has been fully indexed, the second primary data record $E_2$ is indexed starting with the spatial tree index 17. The spatial tree leaf node $S_3(2,3)$ is created, the spatial tree branch node $S_2(1,2)$ already exists and its pointer list 27 is updated to include an additional pointer pointing to the spatial tree leaf node $S_3(2,3)$ and the spatial tree root node $S_1(1,1)$ already exists and does not require its pointer list 27 to be updated to index the second primary data record $E_2$. Next, the time tree indexes 18 corresponding to the spatial tree root node $S_1(,1,1)$ is updated. Although the spatial tree root node $S_1(1,1)$ itself was not created or updated in order to index the second primary data record $E_2$, the time tree indexes 18 corresponding to every spatial tree node $S_n$ which corresponds to a spatial region $R_n(k,j)$ containing the location data $l_v$ of an individual primary data event $E_v$ are updated to index an individual primary data record $E_v$. The second primary data record $E_2$ occurred during the same leaf time period $P_4(i)$ as the first primary data record $E_1$, and all that is needed to update the time tree index 18 corresponding to the spatial tree root node $S_1(1,1)$ (see FIG. 14) is to include an additional source pointer 31 pointing to the second primary data record $E_2$ to the pointer list 27 of the existing time tree leaf node $T_4(1,1,1,1)$. In similar fashion, the first and second primary data records E1, E2 also correspond to the same second level spatial region $R_2(1,2)$, such that all that is needed in order to update the time tree index 18 corresponding to the spatial branch node $S_2(1,2)$ (see FIG. 15b) is to include an additional source pointer 31 pointing to the second primary data record $E_2$ in the pointer list 27 of the existing time tree leaf node $T_4(2,1,2,1)$. Updating the time tree index 18 corresponding to the spatial tree leaf node $S_3(2,3)$ involves creating the time tree nodes $T_4(3,2,3,1)$, $T_3(3,2,3,1)$, $T_2(3,2,3,1)$ and $T_1(3,2,3,1)$, updating the respective pointer lists 27 and updating the time tree pointer 28 for the spatial tree leaf node $S_3(2,3)$ to point to the corresponding time tree root node $T_1(3,2,3,1)$.

The spatial tree index 17 and the time tree indexes 18 are updated in similar fashions according to the previously described method until all the primary data records 7 have been indexed. The completed spatial tree index 17 is shown in FIG. 13 and the completed time tree indexes 18 are shown in FIGS. 14 to 16.

Aggregating Primary Data Records 7

Figure 17:
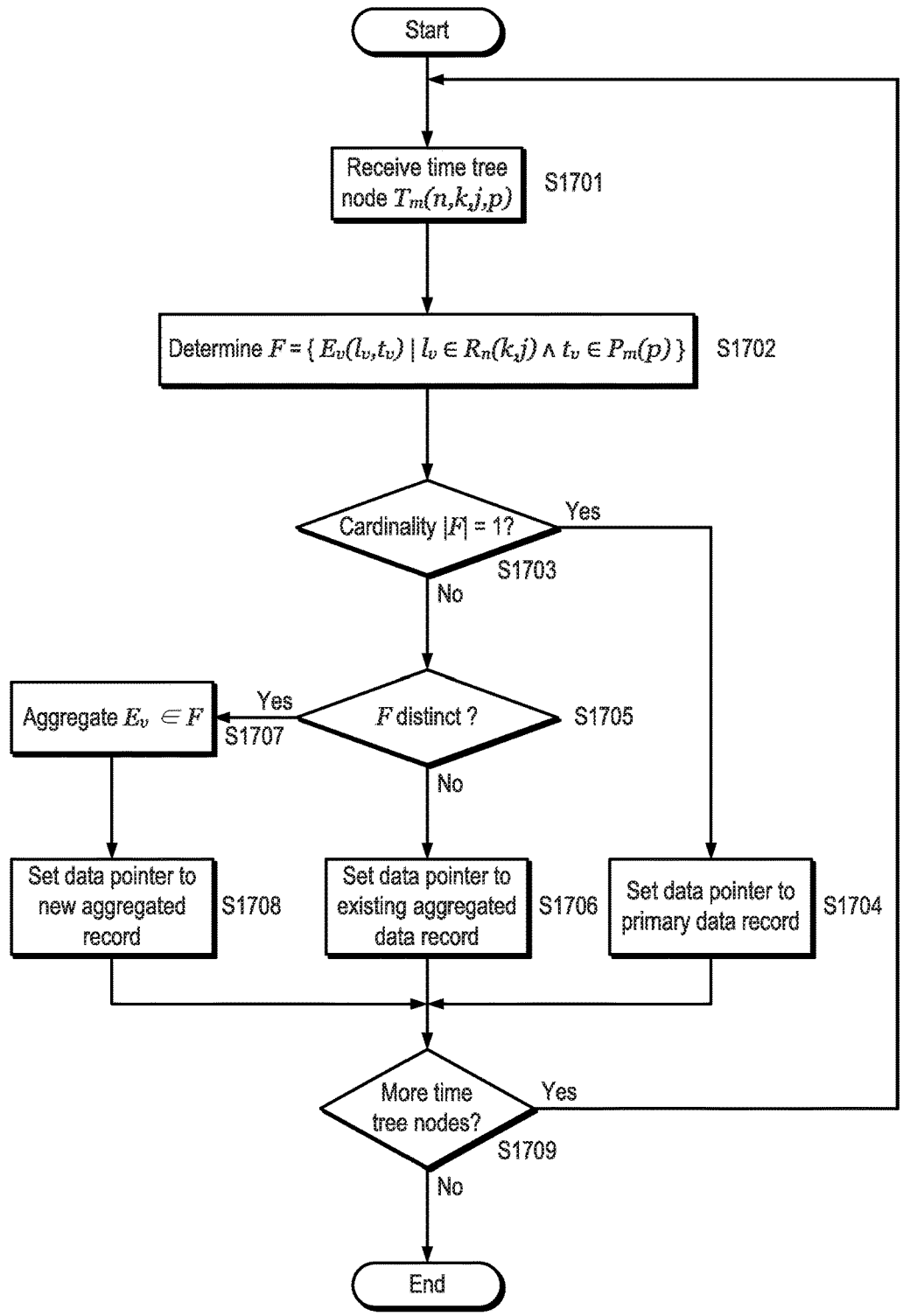
FIG. 17 is a process flow diagram of a method for generating an aggregated data table included in the processed database.

Referring to FIG. 17, an example of a method of aggregating subsets of primary data records 7 corresponding to time tree nodes $T_m$ is shown.

First, a given time tree node $T_m(n,j,k,p)$ is received (step S1701). The time tree nodes $T_m$ may be processed in any order provided that each time tree node $T_m$ is processed.

A subset, F, of primary data records 7 corresponding to the time tree node $T_m(n,j,k,p)$ is determined (step S1702). The subset F includes all primary data records 7 which have time data 9 within the time period corresponding to the given time tree node $T_m(n,j,k,p)$ and location data 8 within the spatial region corresponding to the respective spatial tree node $S_n(k,j)$. Using the nomenclature of the above example, the subset F may be defined using set builder notation according to:

$$F = \{E_v(l_v, t_v) | l_v \in R_n(k,j) \wedge t_v \in P_m(p)\} \qquad (4)$$

The number of primary data records 7 comprised in the subset F is checked (step S1703). If F includes a single primary data record $E_v$, i.e. F has a cardinality of one, then the data pointer 21 of the given time tree node $T_m(n,k,j,p)$ is set to point to the location in the primary data table 16 holding the single primary data record $E_v$ (step S1704).

However, if the subset F includes more than one primary data record 7, i.e. the cardinality of F is greater than one, then it is determined whether the subset F is distinct, or whether one or more previously processed time tree nodes $T_m$ correspond to an identical subset F of primary data records 7 (step S1705). If F is not distinct, then the aggregated data table 20 will already include an existing aggregated data record 19 corresponding to the subset F. In this case, the data pointer 21 of the given time tree node $T_m(n,k,j,p)$ is set to point to the location in the aggregated data table 20 holding the existing aggregated data record 19 corresponding to the subset F of primary data records 7 (step S1706).

However, if the subset F of primary data records 7 is distinct, then a new aggregated data record 19 is generated by aggregating the measurement data 10 of the primary data records 7 included in the subset F of primary data records 7. The aggregated data record 19 generated is written to the aggregated data table 20 (step 1707). Next, the data pointer 21 of the given time tree node $T_m(n,k,j,p)$ is set to point to the location in the aggregated data table 20 holding the newly generated aggregated data record 19 (step 1708). Further examples of aggregating the measurement data 10 of a subset of primary data records 7 are described hereinafter.

After the data pointer 21 has been set (step S1704, S1706, S1708), it is determined whether there are further time tree nodes $T_m$ to process (step S1709). If there are more time tree nodes $T_m$ to process control, then the next given time tree node $T_m(n,k,j,p)$ is received (step S1701) and the aggregating process repeated. If every time tree node $T_m$ belonging to every time tree index 18 has been processed, then the aggregated data table 20 is complete and the process ends.

Although the time tree nodes $T_m$ may be processed in any order, depending on the particular method used to aggregate the measurement data 10, there may be advantages to processing the time tree nodes in a particular order. For example, if the aggregation method is calculating a mean average, then each aggregated data record 19 can additionally include the number of primary data records 7 aggregated to generate that aggregated date record 19. If the time tree nodes $T_m$ are processed in order from the time tree leaf nodes $T_M$ to the time tree root node $T_1$ of each time tree index 18, then mean averages calculated for the m+1$^{th}$ level time tree nodes $T_{m+1}$ could be used to calculate weighted mean average values for the m$^{th}$ level time tree nodes $T_m$. This can improve efficiency by removing the need to retrieve and process increasing numbers of primary data records 7 at each lower level of spatial indexing. Similar considerations would apply to any aggregation process which generates summary statistics that are suitable for further aggregation such as, for example, taking a sum, calculating a standard deviation, taking a maximum or taking a minimum. Aggregation need not be limited to only distinct subsets F of primary data records 7, for example, a new aggregated data record 19 may be generated for the subset F of primary data records 7 corresponding to a given time tree node $T_m(n,k,j,p)$ without checking the subset F against previous processed time tree nodes $T_m$ to ensure that it is distinct.

Example of Aggregating Measurement Data 10

Figure 18:
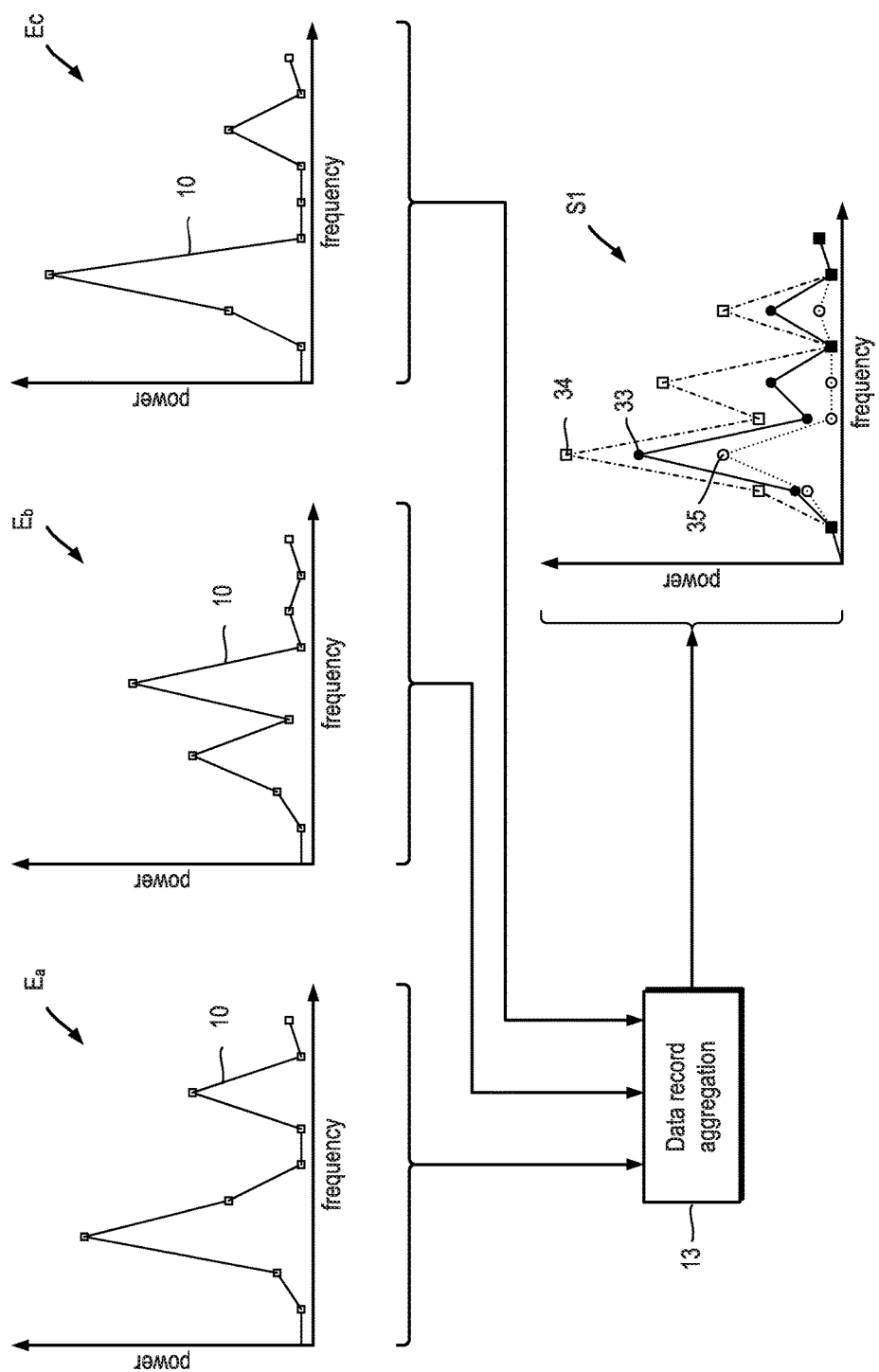
FIG. 18 schematically illustrates aggregating the measurement data of primary data records to generate an aggregated data record stored in the aggregated data table.

Referring to FIG. 18, examples of aggregating the measurement data 10 of three primary data records $E_a$, $E_b$ and $E_c$ to generate aggregated data records 19 are shown.

The measurement data 10 may be radio spectrum data in the form of measured values of signal power $W(f_g)$ at respective given frequencies $f_g$ where g is an integer 1≤g≤G. The data record aggregation module 13 receives the primary data records $E_a$, $E_b$ and $E_c$ and generates an aggregated data record 19 in the form of aggregated values of signal power at the respective given frequencies. For example, the data record aggregation module 13 may produce a mean average aggregated data record 33 by calculating the mean average of the measured values of signal power $W(f_g)$ at each given frequency $f_g$. Alternatively, the data record aggregation module 13 may produce a maximum aggregated data record 34 by selecting the maximum measured value of signal power $W(f_g)$ at each given frequency $f_g$ or a minimum aggregated data record 35 by selecting the minimum measured value of signal power $W(f_g)$ at each given frequency $f_g$.

The measurement data 10 need not be limited to radio spectrum data in the form of measured values of signal power $W(f_g)$ at respective given frequencies $f_g$, and aggregating need not be limited to calculating a mean, a maximum or a minimum. Aggregating may comprise other processes such as, for example, calculating a median, a mode, a sum, a standard deviation, a range, a set of specified percentile values or other types of summary statistics. Aggregating may involve calculating two or more summary statistics. Aggregating may also include determining parameters of a mathematical model such that the model provides the best fit to, or has the minimum sum of squared deviations from, the measured values of signal power for the subset of primary data records 7. The measurement data 10 may be other types of numerical data suitable for aggregation such as, for example, temperature, magnetic field etc. Some types of measurement data 10 may require using aggregation processes specifically suited to the respective data type such as, for example, if the measurement data 10 comprises image data then aggregation may involve producing a collage of several images, or if the measurement data 10 is audio recordings then aggregation may involve multiplexing multiple audio tracks into a single track.

FIG. 19 shows a schematic example of an aggregated data table 20'.

Referring to FIGS. 14 to 16 and 19, the aggregated data table 20' is generated by applying the above described method of aggregating primary data records 7 to the spatial index 17 and the time tree indexes 18 generated for the example of twenty four primary data records $E_1$, ... $E_{24}$ as described hereinbefore.

Figures 11A, 11B, 11C, 11D, 11E, 11F, 11G, 11H:
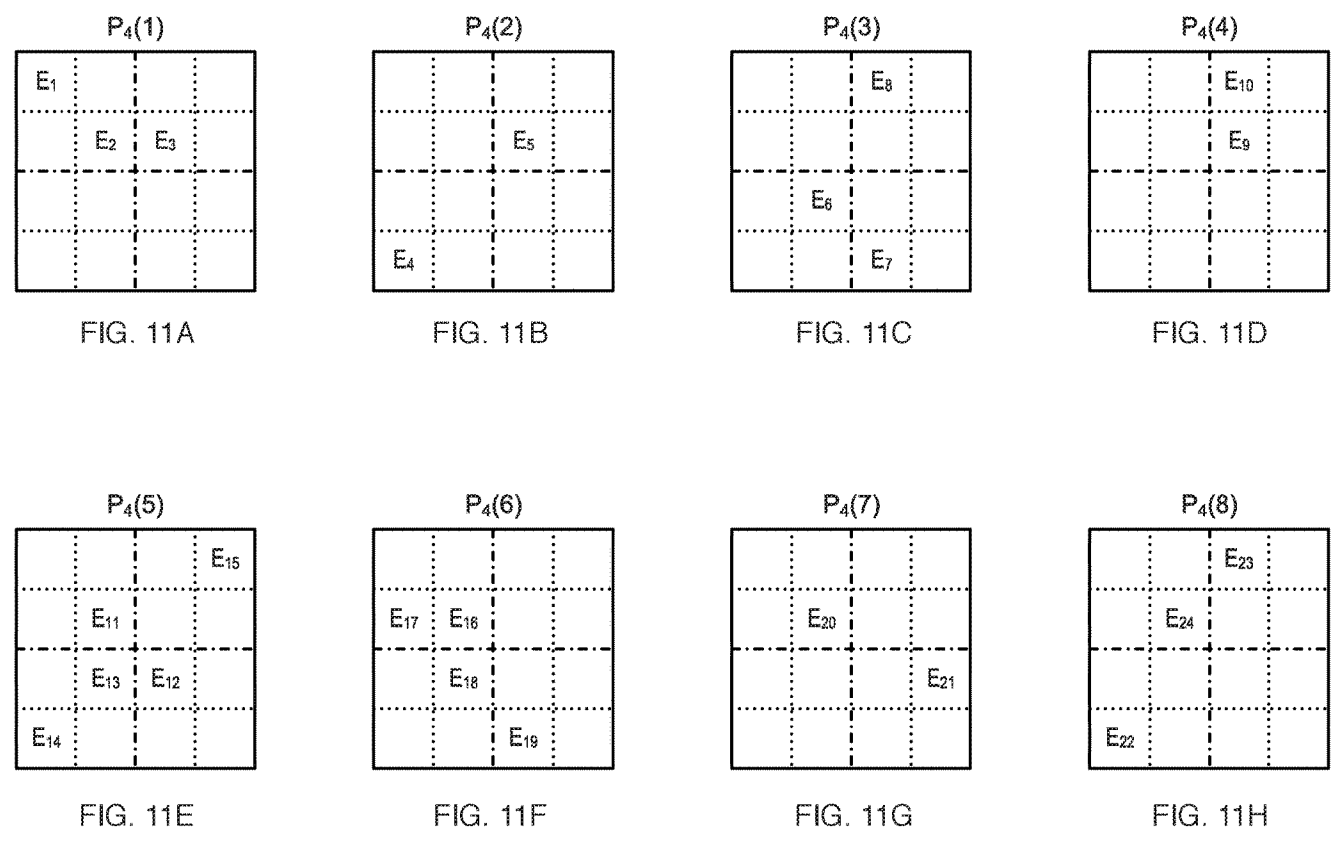

The first entry in the aggregated data table 20' corresponds to aggregating the subset F of primary data records $E_1$, $E_2$ and $E_3$, and is pointed to by the data pointer 21 of time tree node $T_4(1,1,1,1)$, which corresponds to the overall spatial region 29 and the first leaf time period $P_4(1)$ (FIG. 11a).

Some entries in the aggregated data table 20' are pointed to by the data pointers 21 of more than one time tree node $T_m$, for example, the fourth entry corresponding to the subset F of primary data records $E_9$ and $E_{10}$ is pointed to by time tree leaf nodes $T_4(1,1,1,4)$ and $T_4(2,2,2,4)$ both corresponding to the time period $P_4(4)$, and corresponding to the overall spatial region 29 and the second level spatial region $R_2(2,2)$ respectively (FIG. 11d).

Time tree nodes $T_m$ corresponding to only one primary data record 7 have data pointers 21 pointing to that primary data record 7, for example, the data pointer 21 of time tree branch node $T_3(2,1,1,2)$ points to the primary data record $E_6$ (FIG. 15a), and the data pointer 21 of time tree root node $T_1(3,1,3,1)$ points to the primary data record $E_{17}$ (FIG. 16b).

Example of Down-Sampling Measurement Data 10

Figure 20A:
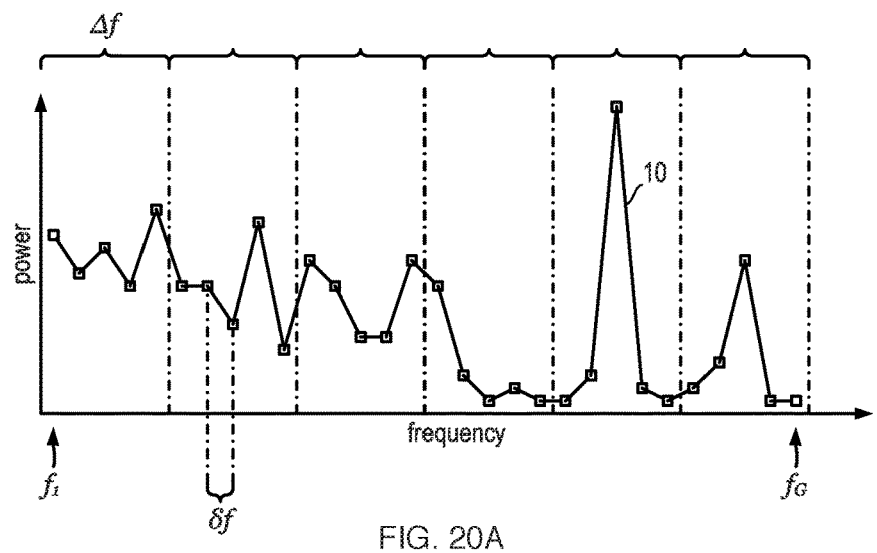
FIGS. 20A-20C schematically illustrate down-sampling the measurement data of a primary data record to generate a down-sampled data record stored in the down-sampled data table included in the processed database.
Figure 20B:
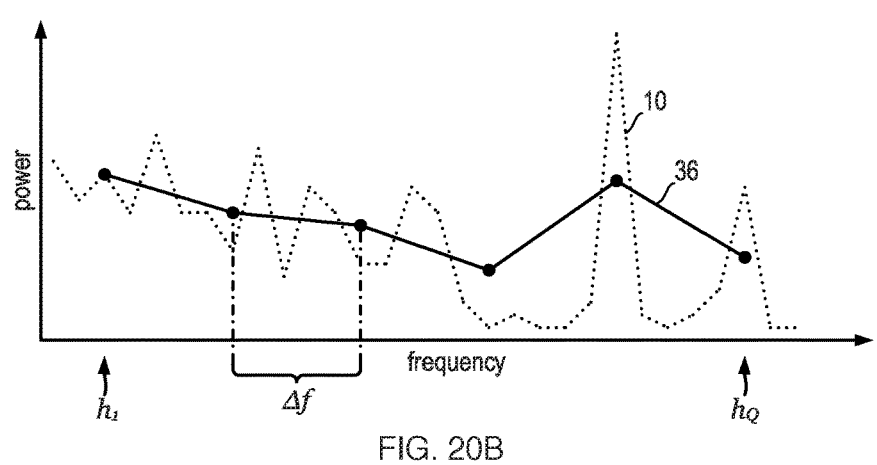
Figure 20C:
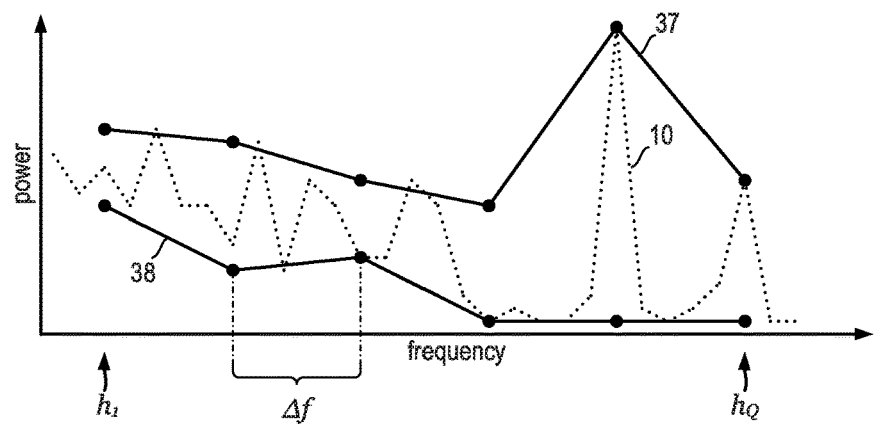

Referring to FIGS. 20a to 20C, an example of down-sampling measurement data 10 of a primary data record 7 is shown.

In this example, the measurement data 10 is radio spectrum data in the form of measured values of signal power $W(f_g)$ at respective given frequencies $f_g$ where 1≤g≤G, which are equally spaced by an amount $\delta f$.

Down-sampling may involve aggregating signal powers within each of a number of frequency bins of width $\Delta f > \delta f$, to produce a down-sampled spectrum of down-sampled signal powers $W'(h_q)$ at respective frequency bin midpoints $h_q$ where q is an integer 1≤q≤Q. For example, the down-sampled signal powers $W'(h_q)$ may be calculated by taking the mean average of the measured values of signal power $W(f_g)$ falling within ±$\Delta f/2$ of each frequency bin midpoint $h_q$, to generate a mean averaged down-sampled spectrum 36. Alternatively, the down-sampled signal powers $W'(h_q)$ may be calculated by taking the maximum/minimum of the measured values of signal power $W(f_g)$ falling within ±$\Delta f/2$ of each frequency bin midpoint $h_q$, to generate a maximum/minimum averaged down-sampled spectrum 37, 38.

The aggregation process used need not be calculating a mean average, a maximum or a minimum, for example, the aggregation process used to down-sample the measured values of signal power $W(f_g)$ falling within $\pm\Delta f/2$ of each frequency bin midpoint $h_q$ may in general be any suitable technique described above for aggregating the measurement data 10 of the primary data records 7 to generated aggregated data records 19. The measurement data 10 need not be radio spectrum data and alternatively may be any suitable pair-wise sequential numerical data. Down-sampling may involve processes specifically suited to the respective data type such as, for example, if the measurement data 10 comprises image data then down-sampling may involve reducing the image resolution or compressing the image, or if the measurement data comprises audio recordings then down-sampling may involve reducing the bit rate or applying an audio compression codec.

Striped Storage of Data Tables 16, 20, 22

The primary/aggregated/down-sampled data tables 16, 20, 23 may be stored in the processed database 4 in the processed database storage 4'. If the data stored in the processed database storage 4' is accessed in pages, then the date records 7, 19, 22 held in the data tables 16, 20, 23 may be stored in striped/interleave order when the measurement data 10 of the primary records comprises measured values at respective given values of an independent variable. For example, the processed database storage 4' may be a hard disc drive. An example of a suitable type of measurement 10 may be radio spectrum data in the form of measured values of signal power at respective given values of frequency. Radio spectrum data may then be stored to a hard disc drive (or similar device) in frequency striped/interleaved order.

Figure 21:
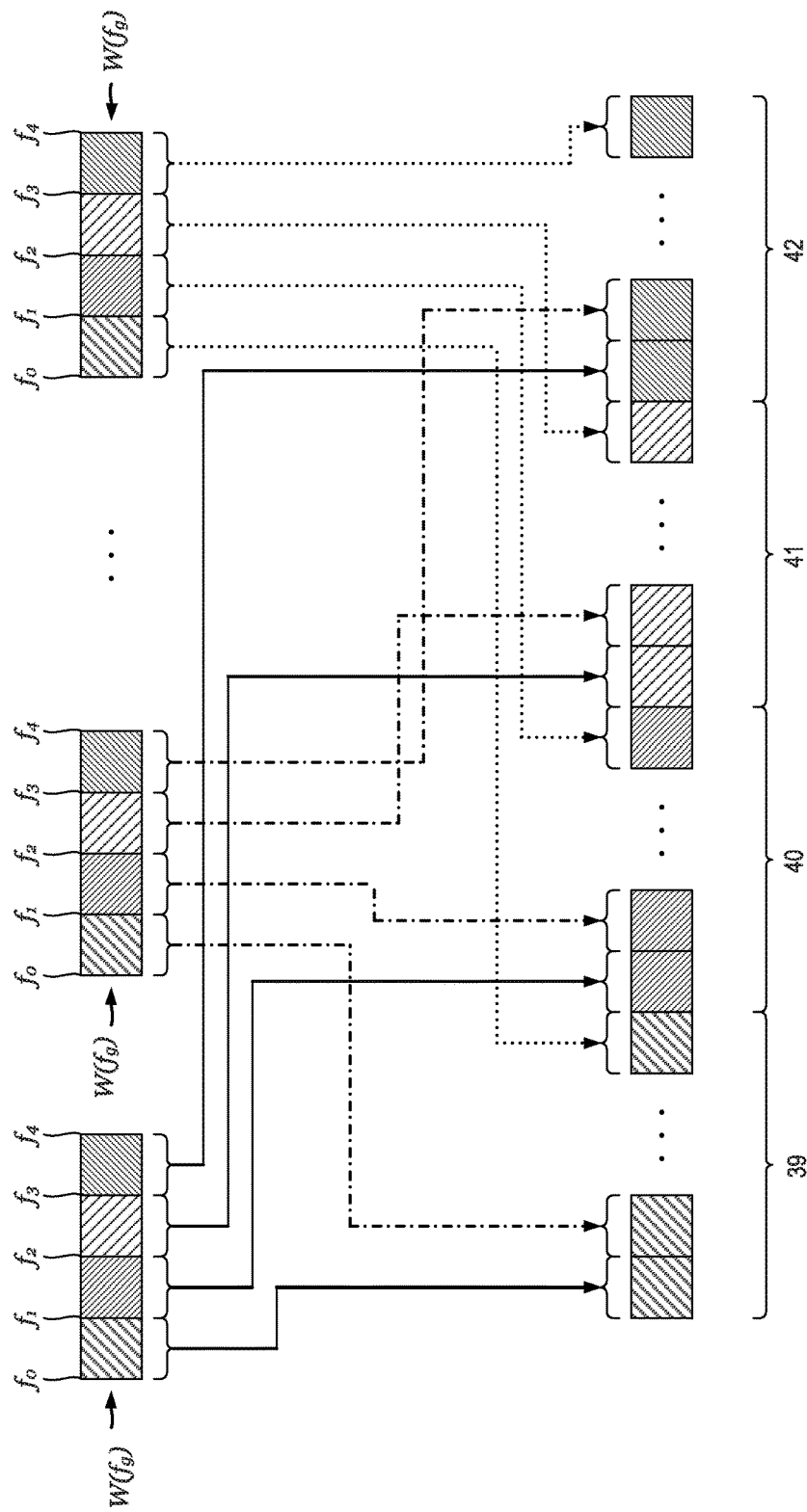
FIG. 21 schematically illustrates striped/interleaved storage of data records in the primary/aggregated/down-sampled data tables.

Referring to FIG. 21, a schematic example of frequency striped/interleaved storage of a set of measurement data 10 in the form of radio spectra $W(f_g)$ is shown.

Each radio spectrum $W(f_g)$ may be divided into equal sized segments, for example, a first segment with $f_0 \leq f_g < f_1$, a second segment with $f_1 \leq f_g < f_2$, a third segment with $f_2 \leq f_g < f_3$ and a fourth segment with $f_3 \leq f_g \leq f_4$. The measurement data 10 can be divided into more or fewer than four segments, dependent on the number of measured values included in the measurement data 10, the page size of the computer readable storage medium and/or user specified parameters.

The segments of each radio spectrum $W(f_g)$ may be written to the computer readable storage medium in respective blocks, for example, a first block 39 may include the first segment, $f_0$ to $f_1$, of the first spectrum $W(f_g)$, followed by the first segment of the second spectrum $W(f_g)$ and so forth until the first segments of every spectrum $W(f_g)$ have been sequentially written to the first block 39. A second block 40 may include the sequentially stored second segments, $f_1$ to $f_2$, of every spectrum $W(f_g)$, a third block 41 may include the sequentially stored third segments, $f_2$ to $f_3$, of every spectrum $W(f_g)$ and a fourth block 42 may include the sequentially stored fourth segments, $f_3$ to $f_4$, of every spectrum $W(f_g)$.

Data access efficiency may be improved by storing the records in striped/interleaved order. For example, if the primary data table 16 include ten primary data records 7, and each primary data record is 40,000 bytes in size. When the ten primary data records 7 are stored on a computer readable storage medium in a simple sequential order, one entire individual primary data record $E_v$ followed by the next entire individual primary data record $E_{v+1}$, then a database query request 25 to retrieve a part of the measurement data 10 of each primary data record 7 such as, for example, the first 256 samples of all ten primary data records 7, would consist of retrieving ten small isolated blocks. A typical hard disc drive may read data in units of pages with for a page size such as, for example, 4096 bytes, so that a total of ten pages, or 10×4096=40960 bytes, would need to be read. This is inefficient, as only 2560 bytes are required in total.

By contrast, if the primary data records 7 include measurement data which is radio spectrum data $W(f_g)$, or similar pair-wise sequential data, then the primary data table 16 may be written to the computer readable storage medium using the striping/interleaving method described above. If the primary data records 7 are written to blocks corresponding to, for example, segments which are each 64 bytes in length, then the database query request 25 to read the first 256 samples of each primary data record 7 will require just the first four blocks, which is 2560 bytes, such that the hard disc drive need only read a single page in this example. For typical spectrum queries, this striping/interleaving approach can improve data access efficiency.

Examples of Querying the Processed Database 4

Figure 22A:
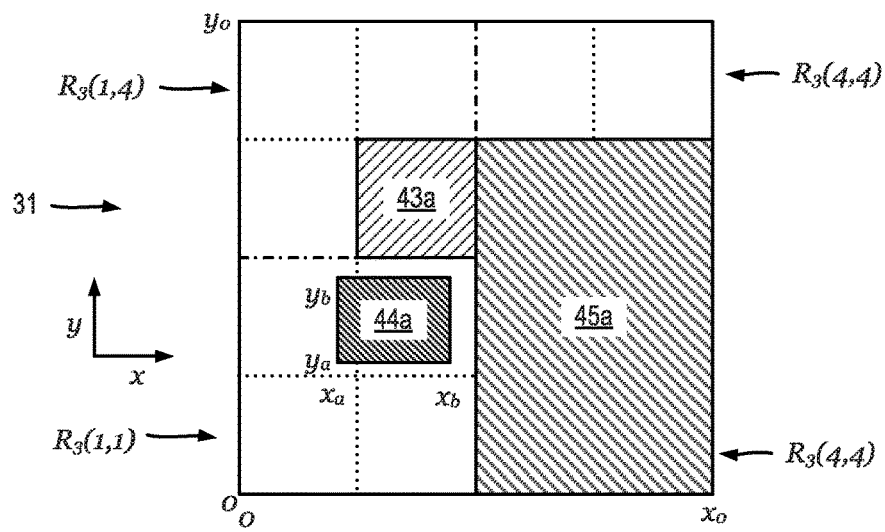
FIG. 22A schematically illustrates queried spatial regions searched for in the processed database by the data analysis server.
Figure 22B:
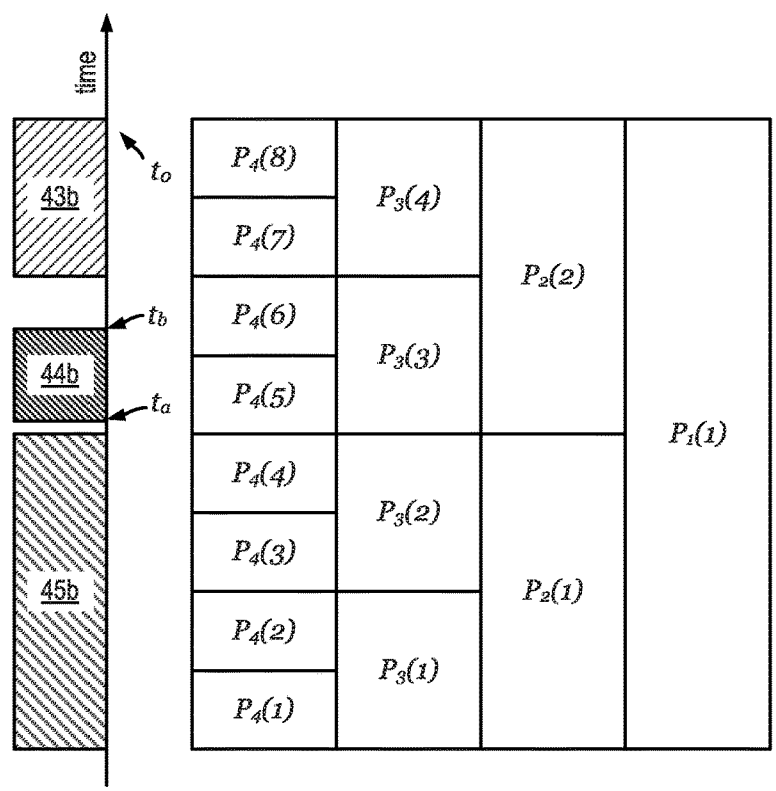
FIG. 22B schematically illustrates queried time periods searched for in the processed database by the data analysis server.

Referring to FIGS. 22a and 22b, queried spatial regions and queried time periods corresponding to examples of database query requests 25 are shown.

The examples described hereinafter of searching and retrieving data records 7, 19, 22 in response to database query requests 25 are made with reference to the hereinbefore described examples of indexing and aggregating primary data records $E_1 \ldots E_{24}$, shown illustratively in FIGS. 9 to 19.

A database query request 25 may specify a queried spatial region which precisely corresponds to a spatial tree node $S_n$ and a queried time period which precisely corresponds to a time tree node $T_m$. For example, a first database query request 43 requests the retrieval of data corresponding to the queried spatial region 43a given by $\frac{1}{4}x_0 \leq x < \frac{1}{2}x_0$ and $\frac{1}{2}y_0 \leq y < \frac{3}{4}y_0$ and the queried time period 43b given by $\frac{3}{4}t_0 \leq t \leq t_0$. The queried spatial region 43a and queried time period 43b correspond precisely to the spatial region $R_3(2,3)$ and the time period $P_3(4)$. The spatial tree index 17 is searched and the spatial tree node $S_3(2,3)$ corresponding precisely to the queried spatial region 43a is selected (see FIG. 13). The time tree index 18 pointed to by the selected spatial tree node $S_3(2,3)$ is searched (see FIG. 16b) and the time tree node $T_3(3,2,3,4)$ corresponding precisely to the queried time period 43b is selected. The corresponding primary data records 7 can then be retrieved by drilling down and retrieving the source pointers 31 from the pointer lists 27 of every time tree leaf node $T_M$ which is descendent from the selected time tree node $T_3(3,2,3,4)$, namely $T_4(4,2,3,7)$ and $T_4(3,2,2,8)$. Thus, the primary data records $E_{20}$ and $E_{24}$ are retrieved.

A database query request 25 need not specify queried spatial regions and time periods precisely corresponding to spatial regions and time periods used by the spatial/time tree indexes 17, 18. For example, a second database query request 44 requests the retrieval of data corresponding to the general queried spatial region 44a given by $x_a \leq x < x_b$ and $y_a \leq y < y_b$ and the general queried time period 44b given by $t_a \leq t \leq t_b$. The data analysis server 5 can handle such a query in several ways. The processed database 4 may be searched and time tree nodes $T_m$ selected which correspond to spatial regions $R_n(k,j)$ and time periods $P_m(p)$ which partially overlap the queried spatial region 44a and queried time period 44b. For example, spatial regions $R_3(1,2)$ and $R_3(2,2)$ and time periods $P_4(5)$ and $P_4(6)$ partially overlap the queried spatial region 44a and queried time period 44b.

However, spatial tree node $S_3(1,2)$ does not exist because no primary data records $E_1, \ldots E_{24}$ correspond to spatial region $R_3(1,2)$ (FIGS. 12 and 13), and the search would result in the selection of time tree node $T_3(3,2,2,3)$ corresponding to the primary data records $E_{13}$ and $E_{18}$. Optionally, once the subset F of primary data records 7 corresponding every spatial region $R_n(k,j)$ and time period $P_m(p)$ partially overlapped by the queried spatial region 44a and queried time period 44b have been retrieved, the location data 8 and time data 9 of each primary data record 7 included in the subset F can be used to select only those primary data records 7 which correspond precisely to the queried spatial region 44a and queried time period 44b. In this way, primary data records 7 corresponding to a generic queried spatial region 44a and generic queried time period 44b, which are unrelated to the spatial regions $R_n(k,j)$ and time periods $P_m(p)$ used to generate the processed database 4, can be efficiently retrieved by using the spatial index 17 and the time tree indexes 18 to retrieve a subset F of primary data records 7 for direct comparison against the queried spatial region 44a and queried time period 44b.

Alternatively, the processed database 4 may be searched and time tree nodes $T_m$ corresponding to the spatial regions $R_n(k,j)$ and time periods $P_m(p)$ may be selected of which a majority is overlapped by the queried spatial region 44a or queried time period 44b respectively. For example, more than half the spatial region $R_3(2,2)$ is overlapped by the queried spatial region 44a so nodes corresponding to spatial region $R_3(2,2)$ are selected, whereas less than half the spatial region $R_3(1,2)$ is overlapped by the queried spatial region 44a so nodes corresponding to spatial region $R_3(1,2)$ is not selected.

A database query request 25 specify a queried spatial region and a queried time period which span multiple leaf spatial regions $R_N(k,j)$ and multiple leaf time periods $P_M(p)$. For example, a third database query request 45 requests the retrieval of data corresponding to the queried spatial region 45a given by $\frac{1}{2}x_0 \leq x < x_0$ and $0 \leq y < \frac{3}{4}y_0$ and the queried time period 45b given by $0 \leq t \leq \frac{1}{2}t_0$. The queried spatial region 45a corresponds to the spatial regions $R_2(2,1)$, $R_3(3,3)$ and $R_3(4,3)$ and when the spatial tree index 17 is searched the spatial tree nodes $S_2(2,1)$ and $S_3(3,3)$ are selected because spatial tree nodes $S_3(4,3)$ has no corresponding primary data records and is omitted (FIGS. 12 and 13). The queried time period 45b corresponds to the time period $P_2(1)$, and when the time tree indexes 18 pointed to be the selected spatial tree nodes are searched the corresponding time tree nodes $T_2(2,2,1,1)$ and $T_2(3,3,3,1)$ are selected which correspond to the primary data records E3, E5, E7 and E9.

The example of the third database query request 45 highlights how the processed database 4 can increase the efficiency of query requests directed to queried spatial regions spanning multiple spatial leaf spatial regions. Using the processed database 4, only two time tree indexes 18 need to be searched to retrieve the primary data records 7 corresponding to the queried spatial region 45a and queried time period 45b. This is because each spatial tree node $S_n$ points to a unique time tree index 18. By contrast, if only the spatial tree leaf nodes $S_N$ pointed to corresponding time tree indexes 18, then four time tree indexes 18 would need to be search, corresponding to each spatial tree leaf node $S_3(3,1)$, $S_3(3,2)$, $S_3(3,3)$ and $S_3(4,2)$ for which there were corresponding primary data records 7.

The relative improvement in data search and access efficiency provided by the spatial index 17, in which every spatial tree node $S_n$ points to a unique time tree index 18, increases with the number of spatial tree leaf nodes $S_N$ which correspond to the queried spatial region. For the example shown in FIGS. 11 and 12, if a database query request 25 involves retrieve primary data records for the overall spatial region 31 during a particular queried time period, then using the processed database 4 would involve searching a single time tree index 18 pointed to be the spatial tree root node $S_1(1,1)$. By contrast, an indexing method in which only the spatial tree leaf nodes point to corresponding time tree indexes 18 would require searching of eleven time tree indexes 18.

If the processed database 4 includes the aggregated data table, then the efficiency with which an operator can obtain and review summary statistics/overview information relevant to the primary data records 7 corresponding to a queried spatial region and queried time period can be further improved.

When the processed database 4 includes the aggregated data table 20, the step of drilling down to the time tree leaf nodes $T_M$ which are descend from the selected time tree nodes $T_m$ to retrieve a listing of source pointers 31 may be omitted. For example, in response to the first database query request 43, if the operator requests summary statistics relating to the queried spatial region 43a and queried time period 43b, then the aggregated data record(s) 19 pointed to by the data pointer 21 of time tree node $T_3(3,2,3,4)$ may be retrieved, see the fortieth entry of example aggregated data table 20' (FIG. 19). This is more efficient than drilling down to the time tree leaf nodes $T_4(4,2,3,7)$ and $T_4(3,2,2,8)$, retrieving the primary data records $E_{20}$ and $E_{24}$ and then aggregating the primary data records $E_{20}$ and $E_{24}$ in response to the database query request 43. Thus, pre-processing the primary data records 7 to produce aggregated data records 19 can improve the speed at which an operator can access and review data stored by the processed database 4.

When very large numbers of primary data records 7 are stored in the processed database 4, for example of the order $10^4$, $10^6$, $10^9$ or greater, then the increase in the speed with which an operator can access and review data stored by the processed database 4 can be significantly increased.

Additional improvements to the efficiency with which an operator can access and review data can be provided by the inclusion of the down-sampled data table 22 in the processed database 4.

Down-sampling primary and/or aggregated data records 7, 19 during the pre-processing and compilation of the processed database 4 can improve data access and review performance in cases when the measurement data 10 of the primary data records 7 is too extensive to be simultaneously displayed at once, for example on a computer screen. For example, if the measurement data 10 comprises measured values of signal power $W(f_g)$ at respective given frequencies $f_g$ where g is an integer $1 \leq g \leq G$ and the operator is to be presented with a graph of signal power $W(f_g)$ against frequency $f_g$ for a retrieved primary data record 7 or aggregated data record 19. If the spectrum is large, for example, if G is of the order of $10^4$ or $10^6$, then plotting every measured values of signal power $W(f_g)$ at every given frequencies $f_g$ would be computational demanding to draw and in any event pointless because the display, let alone the operator, would not be able to resolve every single data pair.

When displaying large datasets, it can be helpful to down-sample the dataset before displaying it, for example, $10^6$ samples may be down-sampled to several hundreds or a thousand before plotting a graph. As the operator zooms in on a section of the data, the section of the dataset on which the operators view is focused may be down-sampled, for example, if the operator is viewing a range containing $10^4$ out of $10^6$ samples, then the 104 samples may be down-sampled to several hundred or a thousand before plotting the graph. When the operator has zoomed in far enough that a manageable number of the original sample points would be displayed, the original samples are used to plot the graph. However, performing such down-sampling on demand whilst the operator browses the dataset can be slow and can lead to substantial delays in updating the display.

Using the data pre-processing module 3 to pre-generate one or more down-sampled data records 22 corresponding to each primary and/or aggregated data record 7, 19 and storing them in the down sampled data table 23 of the processed database 24 can improve the efficiency of data access and review because the down-sampled data records 22 may be simply retrieved from the processed database 4 instead of having to be calculated on demand. For example, if the measurement data 10 of the primary data records 7 comprises measured values of signal power $W(f_g)$ at respective given frequencies $f_g$ where g is an integer $1 \leq g \leq G$ and $G=10^6$, then the data record down-sampling module may produce first, second and third down-sampled data records 22 corresponding to each primary data record 7 and including $10^5$, $10^4$ and $10^3$ values of down-sampled signal power respectively. When the operator views a graph of signal power against frequency, the most appropriate data record out of the primary data record 7 and the first, second or third down-sampled data records 19 can be retrieved and used to produce the graph, dependent on the range for the frequency axis.

When data records 7, 19, 22 are stored using the striping/interleaving method described above, further improvements in data access speed may be provided when the processed database 4 is stored on a computer readable storage medium which access data in units of pages, for example, a hard disc drive, CD or DVD.

Modifications

It will be appreciated that various modifications may be made to the embodiments hereinbefore described. Such modifications may involve equivalent and other features which are already known in the design, manufacture and use of databases and data processing apparatuses and component parts thereof and which may be used instead of or in addition to features already described herein. Features of one embodiment may be replaced or supplemented by features of another embodiment For example, the processes of building the spatial index 17 and the corresponding time tree indexes 18 have been described separately from the process of generating aggregated data records 19. However, when the aggregated data table 20 is included in the processed database 4, the two processes of generating indexes and aggregating data records may be merged and performed by a single module.

The processed database 4 may include more than one set of indexes 17, 18, and more than one set of data tables 16, 20, 23. For example, primary data records 7 having measurement data which is radio spectrum data may be obtained by several measuring station or mobile measurement units, and a separate processed database 4 including a set of indexes 17, 18, and a set of data tables 16, 20, 23, also referred to as a data thread, may be generated corresponding to each individual measuring station or mobile measurement unit.

The invention claimed is:

1. A computing device-implemented method of processing a primary data record comprising location data, time data and measurement data, a spatial tree index comprising spatial tree nodes linked by pointers, each spatial tree node corresponding to a given spatial region and further including a pointer to a respective time tree index, and a plurality of time tree indexes, each time tree index corresponding to a respective spatial tree node and comprising time tree nodes linked by pointers, wherein each time tree node corresponds to a given time period, the method comprising:
   writing the primary data record to a primary data table;
   determining whether a spatial tree leaf node exists which corresponds to the spatial region that includes the location data;
   on a negative determination, generating a spatial tree leaf node which corresponds to the spatial region that includes the location data, and creating or updating spatial tree nodes connecting the spatial tree leaf node to a spatial tree root node;
   for the spatial tree nodes which correspond to each region that includes the location data, updating the respective time tree index by:
   determining whether a time tree leaf node exists which corresponds to the time period that includes the time data;
   on a negative determination, generating the time tree leaf node which corresponds to the time period that includes the time data, and creating or updating time tree nodes connecting the time tree leaf node to a time tree root node; and
   updating the time tree leaf node to include a pointer to the primary data record,
   wherein the spatial tree index is a quad tree index, such that the spatial tree root node corresponds to an overall spatial region and each higher level of the spatial tree index includes $4^{n-1}$ $n^{th}$ level spatial tree nodes, each of the $n^{th}$ level spatial tree nodes corresponding to a spatial sub-region formed by dividing the overall spatial region into $4^{n-1}$ equal sized parts, in which n is equal to a number of connections between the spatial tree root node and an $n^{th}$ level spatial tree node plus one.

2. A method of generating a database, the method comprising:
   processing a plurality of primary data records using a method according to claim 1;
   for each time tree node, determining a subset of the plurality of primary data records which have time data included in the respective time period and location data included in the respective spatial region;
   in dependence on the subset including one primary data record, updating the time tree node to further include a data pointer to the primary data record;
   in dependence on the subset including more than one primary data record, generating an aggregated data record by aggregating the measurement data of the respective primary records included in the subset, writing the aggregated data record to an aggregated data table and updating the time tree node to further include a data pointer to the aggregated data record.

3. A method according to claim 2, wherein an aggregated data record is only generated for a distinct subset, such that the data pointers of time tree nodes which correspond to an identical subset point to a single aggregated data record.

4. A method according to claim 2, wherein each time tree node which belongs to a time tree index that corresponds to a spatial tree leaf node further includes a list of pointers to each of the primary data records included in the respective subset.

5. A method according to claim 2, wherein the measurement data of each primary data record comprises one or more sets of measured values corresponding to respective values of an independent variable, and optionally, the method further comprises:

for each primary and/or aggregated data record, generating at least one corresponding down-sampled data record by aggregating the measured values of the data record based on ranges of the independent variables;

writing the down-sampled data record to a down-sampled data table;

updating each time tree node to further include at least one down-sampled data pointer to a down-sampled data record which corresponds to a data record pointed to by the time tree node.

6. A method according to claim 2, wherein aggregating comprises calculating summary statistics based on the measurement data of primary data records.

7. A method according to claim 2, the method further comprising storing the data tables of data records on a computer readable storage medium, and optionally, wherein data stored on the computer readable storage medium is accessed in units of pages, wherein storing the data tables of data records comprises:

writing the data records to the storage medium in blocks, each block based on a given range of the independent variable such that individual data records are stored in a striped fashion across a plurality of blocks;

wherein blocks are written sequentially to the storage medium based on the respective range of the independent variable and a pointer to a given data record points to the location of the computer readable storage medium corresponding to the start of the given data record in the first block.

8. A method of searching a database produced according to the method of claim 2, the method comprising:

receiving a query including spatial region information and time period information;

selecting one or more spatial tree nodes based on the spatial region information;

for each of the time tree indexes corresponding to the selected one or more spatial tree nodes, selecting one or more time tree nodes based on the time period information;

retrieving one or more data records pointed to by the selected time tree nodes.

9. A method according to claim 8, further comprising retrieving one or more data records pointed to by higher level time tree nodes descendent from the one or more selected time tree nodes.

10. A computer program stored on a non-transitory computer readable medium which, when executed by a data processing apparatus, causes the data processing apparatus to perform a method according to claim 1.

11. Apparatus for processing a plurality of primary data records, each comprising location data, time data and measurement data, the apparatus comprising:

a primary data table formatting module configured to receive the plurality of primary data records and write them to a primary data table;

an index generation module configured to generate:

a spatial tree index comprising spatial tree nodes linked by pointers, each spatial tree node corresponding to a spatial region and further including a pointer to a respective time tree index; and a plurality of time tree indexes, each time tree index corresponding to a respective spatial tree node and comprising time tree nodes linked by pointers, wherein each time tree node corresponds to a time period;

wherein the index generation module is configured to generate the spatial tree index and the plurality of time tree indexes by sequentially receiving each primary data record and, for each primary data record:

determine whether a spatial tree leaf node exists which corresponds to the spatial region that includes the location data;

on a negative determination, generate a spatial tree leaf node which corresponds to the spatial region that includes the location data, and to create or update spatial tree nodes connecting the spatial tree leaf node to a spatial tree root node;

for each time tree index pointed to by a spatial tree node which corresponds to a spatial region that includes the location data:

determine whether a time tree leaf node exists which corresponds to the time period that includes the time data;

on a negative determination, generate the time tree leaf node which corresponds to the time period that includes the time data, and create or update time tree nodes connecting the time tree leaf node to a time tree root node; and update the time tree leaf node to include a pointer to the primary data record, wherein the spatial tree index is a quad tree index, such that the spatial tree root node corresponds to an overall spatial region and each higher level of the spatial tree index includes $4^{n-1}$ $n^{th}$ level spatial tree nodes, each of the $n^{th}$ level spatial tree nodes corresponding to a spatial sub-region formed by dividing the overall spatial region into $4^{n-1}$ equal sized parts, in which n is equal to a number of connections between the spatial tree root node and an $n^{th}$ level spatial tree node plus one.

12. Apparatus according to claim 11, wherein the index generation module is further configured to determine, for each time tree node, a subset of the plurality of primary data records which have time data included in the respective time period and location data included in the respective spatial region, the apparatus further comprising;

a data record aggregation module configured to receive a plurality of subsets and to generate, for each subset, a corresponding aggregated data record by aggregating the measurement data of the respective primary data records included in the subset;

an aggregated data table formatting module configured to receive the plurality of aggregated data records and write them to an aggregated data table;

wherein the index generation module is further configured to update each time tree node to include a data pointer configured to:

in dependence on the respective subset comprising one primary data record, point to the primary data record;

in dependence on the subset comprising more than one primary data record, point to the corresponding aggregated data record.

13. A database for storing a plurality of primary data records comprising location data, time data and measurement data, the database comprising:

a primary data table holding the plurality of primary records;

a spatial quad tree index comprising a plurality of spatial tree nodes, each spatial tree node corresponding to a spatial region and including a pointer the time tree root node of a corresponding time tree index and a list of up to four pointers to respective child spatial tree nodes;

a plurality of time tree indexes, each time tree index corresponding to a respective spatial tree node and comprising a plurality of time tree nodes, each time tree node corresponding to a time period and including:

in dependence on the time tree node being a root or branch node, a list of one or more pointers pointing to respective child time tree nodes;

in dependence on the time tree node being a leaf node, a list of one or more pointers pointing to primary data records which have time data included in the respective time period and location data included in the respective spatial region.

14. A database according to claim 13, the database further comprising:

an aggregated data table storing a plurality of aggregated data records generated by aggregating the measurement data of a subset of primary data records, wherein each subset corresponds to a given time tree node and includes the primary data records which have time data included in the respective time period and location data included in the respective spatial region, and wherein the aggregated data table only includes aggregated data records corresponding to distinct subsets of primary records;

wherein each time tree node further includes a data pointer configured such that:

in dependence on the subset comprising one primary data record, the data pointer points to the primary data record;

in dependence on the subset comprising more than one primary data record, the data pointer points to an aggregated data record corresponding to the subset.

* * * * *